United States Patent
Ma

(10) Patent No.: US 10,032,285 B1
(45) Date of Patent: Jul. 24, 2018

(54) MULTI-HYPOTHESIS MOVING OBJECT DETECTION SYSTEM

(71) Applicant: National Technology & Engineering Solutions of Sandia, LLC, Albuquerque, NM (US)

(72) Inventor: Tian J. Ma, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 79 days.

(21) Appl. No.: 15/287,472

(22) Filed: Oct. 6, 2016

Related U.S. Application Data

(60) Provisional application No. 62/251,327, filed on Nov. 5, 2015.

(51) Int. Cl.
*G06K 9/00* (2006.01)
*G06T 7/20* (2017.01)
*G06T 7/00* (2017.01)

(52) U.S. Cl.
CPC .............. *G06T 7/20* (2013.01); *G06T 7/0034* (2013.01); *G06T 2207/10016* (2013.01); *G06T 2207/30241* (2013.01)

(58) Field of Classification Search
CPC . H04L 65/4069; H04L 65/607; H04N 19/167; H04N 19/174; H04N 19/184; H04N 19/70

USPC ......... 382/103, 167, 243, 181, 203; 345/619
See application file for complete search history.

(56) References Cited

U.S. PATENT DOCUMENTS

| | | | | |
|---|---|---|---|---|
| 7,143,434 B1 * | 11/2006 | Paek | ................. | G06F 17/30858 725/142 |
| 7,928,395 B2 * | 4/2011 | Grimberg | .................. | G01J 5/22 250/349 |
| 8,565,478 B2 * | 10/2013 | van Eekeren | ......... | G06T 3/4053 382/103 |

OTHER PUBLICATIONS

Grossi, E. et al., "A Heuristic Algorithm for Track-Before-Detect With Thresholded Observations in Radar Systems," IEEE Signal Processing Letters, vol. 20, No. 8, Aug. 2013, pp. 811-814.

(Continued)

*Primary Examiner* — Charlotte M Baker
(74) *Attorney, Agent, or Firm* — Yee & Associates, P.C.; Samantha Updegraff

(57) ABSTRACT

A method and apparatus for analyzing a sequence of images. Signal-to-noise ratios are identified for potential tracks using a tree having hierarchies of nodes identifying potential positions for an object over a period of time and using the sequence of images. Each hierarchy in the hierarchies of nodes represents a time and the potential positions in the tree form the potential tracks for the object. A potential track is selected from the potential tracks as an established track for the object using the signal-to-noise ratios, and a detection of the object is reported.

23 Claims, 13 Drawing Sheets

(56) References Cited

OTHER PUBLICATIONS

Grossi, E. et al., "A Novel Dynamic Programming Algorithm for Track-Before-Detect in Radar Systems," IEEE Transactions on Signal Processing, vol. 61, No. 10, May 2013, pp. 2608-2619.
Reed, I. et al., "A Recursive Moving-Target-Indication Algorithm for Optical Image Sequences," IEEE Transactions on Aerospace and Electronic Systems, vol. 26, No. 3, May 1990, pp. 434-440.
Yi, W. et al., "An Efficient Multi-Frame Track-Before-Detect Algorithm for Multi-Target Tracking," IEEE Journal of Selected Topics in Signal Processing, vol. 7, No. 3, Jun. 2013, pp. 421-434.
Blackman, S.S. "Multiple Hypothesis Tracking for Multiple Target Tracking," IEEE A&E Systems Magazine, Part 2: Tutorials, vol. 19, No. 1, Jan. 2004, pp. 5-18.

* cited by examiner

| HYPOTHESES | POSSIBLE PATH (t=1 TO t=4) | SNR |
|---|---|---|
| 1 | $z_1$-$z_2$-$z_4$-$z_6$ | 10.5 |
| 2 | $z_1$-$z_2$-$z_4$-$z_7$ | 10 |
| 3 | $z_1$-$z_2$-$z_5$-$z_7$ | 9.5 |
| 4 | $z_1$-$z_3$-$z_5$-$z_7$ | 7.0 |

| HYPOTHESES | POSSIBLE PATH (t=1 TO t=5) | SNR |
|---|---|---|
| 1 | $z_2$-$z_4$-$z_6$-$z_8$ | 9.0 |
| 2 | $z_2$-$z_4$-$z_6$-$z_9$ | 10.0 |
| 3 | $z_2$-$z_4$-$z_7$-$z_9$ | 10.5 |
| 4 | $z_2$-$z_4$-$z_7$-$z_{10}$ | 11.5 |
| 5 | $z_2$-$z_5$-$z_7$-$z_9$ | 9.5 |
| 6 | $z_2$-$z_5$-$z_7$-$z_{10}$ | 11.0 |

| HYPOTHESES | POSSIBLE PATH (t=1 TO t=6) | SNR |
|---|---|---|
| 1 | $z_4$-$z_6$-$z_8$-$z_{11}$ | 3.0 |
| 2 | $z_4$-$z_6$-$z_8$-$z_{12}$ | 4.0 |
| 3 | $z_4$-$z_6$-$z_9$-$z_{12}$ | 5.0 |
| 4 | $z_4$-$z_7$-$z_9$-$z_{12}$ | 5.5 |
| 5 | $z_4$-$z_7$-$z_{10}$-$z_{13}$ | 10.5 |
| 6 | $z_4$-$z_7$-$z_{10}$-$z_{14}$ | 11.5 |

| HYPOTHESES | POSSIBLE PATH (t=1 TO t=7) | SNR |
|---|---|---|
| 1 | $z_7$-$z_9$-$z_{12}$-$z_{15}$ | 3.0 |
| 2 | $z_7$-$z_9$-$z_{12}$-$z_{16}$ | 4.0 |
| 3 | $z_7$-$z_9$-$z_{13}$-$z_{16}$ | 5.0 |
| 4 | $z_7$-$z_{10}$-$z_{13}$-$z_{16}$ | 5.5 |
| 5 | $z_7$-$z_{10}$-$z_{13}$-$z_{17}$ | 6.5 |
| 6 | $z_7$-$z_{10}$-$z_{14}$-$z_{17}$ | 11.5 |
| 7 | $z_7$-$z_{10}$-$z_{14}$-$z_{18}$ | 10.5 |

MULTI-HYPOTHESIS MOVING OBJECT DETECTION SYSTEM

RELATED PROVISIONAL APPLICATION

This application claims the benefit of U.S. Provisional Patent Application Ser. No. 62/251,327, filed Nov. 5, 2015.

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved object detection system and, in particular, to a method and apparatus for detecting moving objects in a sequence of images.

2. Background

Detecting and tracking objects in real world situations can be a challenging problem. For example, the sensor system may be located far enough away from an object such that the object is dim in the image, making detecting the object more difficult. For example, the object brightness may be below a desired threshold for the sensor system to detect the presence of the object. In this situation, a lower detection threshold may be used. This lower threshold, however, may result in a higher than desired rate of false alarms.

For example, the signal-to-noise ratio (SNR) of the moving object may be low enough that the object cannot be detected in a single frame. Currently used techniques include, for example, track before detect (TBM) techniques. One track before detect method is a velocity matched filter (VMF), which is a multi-frame signal integration approach. This type of technique may be used to enhance the signal-to-noise ratio for the object.

These techniques, however, do not always provide the desired result for detecting moving objects. Therefore, it would be desirable to have a method and apparatus that take into account at least some of the issues discussed above, as well as other possible issues. For example, it would be desirable to have a method and apparatus that overcome a technical problem with detecting moving objects in images with a desired level of accuracy.

SUMMARY

An embodiment of the present disclosure provides a method for analyzing a sequence of images. The method identifies signal-to-noise ratios for potential tracks using a tree having hierarchies of nodes identifying potential positions for an object over a period of time and using the sequence of images. Each hierarchy in the hierarchies of nodes represents a time and the potential positions in the tree form the potential tracks for the object. A potential track is selected from the potential tracks as an established track for the object using the signal-to-noise ratios. A detection of the object is reported.

Another embodiment of the present disclosure provides an apparatus that includes an image analyzer. The image analyzer identifies signal-to-noise ratios for potential tracks using a tree having hierarchies of nodes identifying potential positions for an object over a period of time and using a sequence of images. Each hierarchy in the hierarchies of nodes represents a time and the potential positions in the tree form the potential tracks for the object. The image analyzer selects a potential track from the potential tracks as an established track for the object using the signal-to-noise ratios and reports a detection of the object.

Yet another embodiment of the present disclosure provides a moving object detection system that comprises a track detector, a track combiner, and a track extender. The track detector creates a tree having hierarchies of nodes identifying potential positions for an object that moves over time using a sequence of images. Each hierarchy in the hierarchies of nodes represents a time and the potential positions in the tree form potential tracks for the object that identifies a track in a sequence of images. The track detector identifies signal-to-noise ratios for the potential tracks and selects a potential track from the potential tracks as an established track for the object using the signal-to-noise ratios. The track combiner, in communication with the track detector, receives the established track from the track detector and determines whether the established track is a new track using a group of existing tracks. The track extender, in communication with the track combiner, receives the new track from the track combiner and adds the new track to the group of existing tracks.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that a movement of an object increases the difficulty in detecting the object in multiple sequential images. For example, the object may change velocity, acceleration, direction, or some combination thereof.

The illustrative embodiments recognize and take into account that these types of changes in movement often cause velocity matched filtering (VMF) techniques and other types of track before detect (TBD) techniques to miss detecting the object. These techniques assume a constant object trajectory over a sequence of frames and model the movement of the object using these assumptions. The illustrative embodiments recognize and take into account that the number of frames that can be used in signal integration using current techniques is more limited than desired to obtain a desired level of accuracy. In this illustrative example, the signal integration occurs by summing a sequence of images over a period of time. For example, signal integration means intensity values for objects are combined over a sequence of images, such as frames in a video.

Thus, the illustrative embodiments provide a method and apparatus for detecting moving objects with signal-to-noise ratios that may be lower than desired. The illustrative embodiments do not assume a constant trajectory over a sequence of frames. In one illustrative example, a method is present for analyzing a sequence of images. Signal-to-noise ratios are identified for potential tracks using a tree having hierarchies of nodes and using the sequence of images. The nodes represent potential positions for an object over a period of time. Each hierarchy in the hierarchies of nodes represents a time, and the potential positions in the tree form the potential tracks for the object. A potential track is selected from the potential tracks as an established track for the object using the signal-to-noise ratios. A detection of the object is reported. In addition, the illustrative embodiments also may use this process to track the movement of an object.

Figure 1:
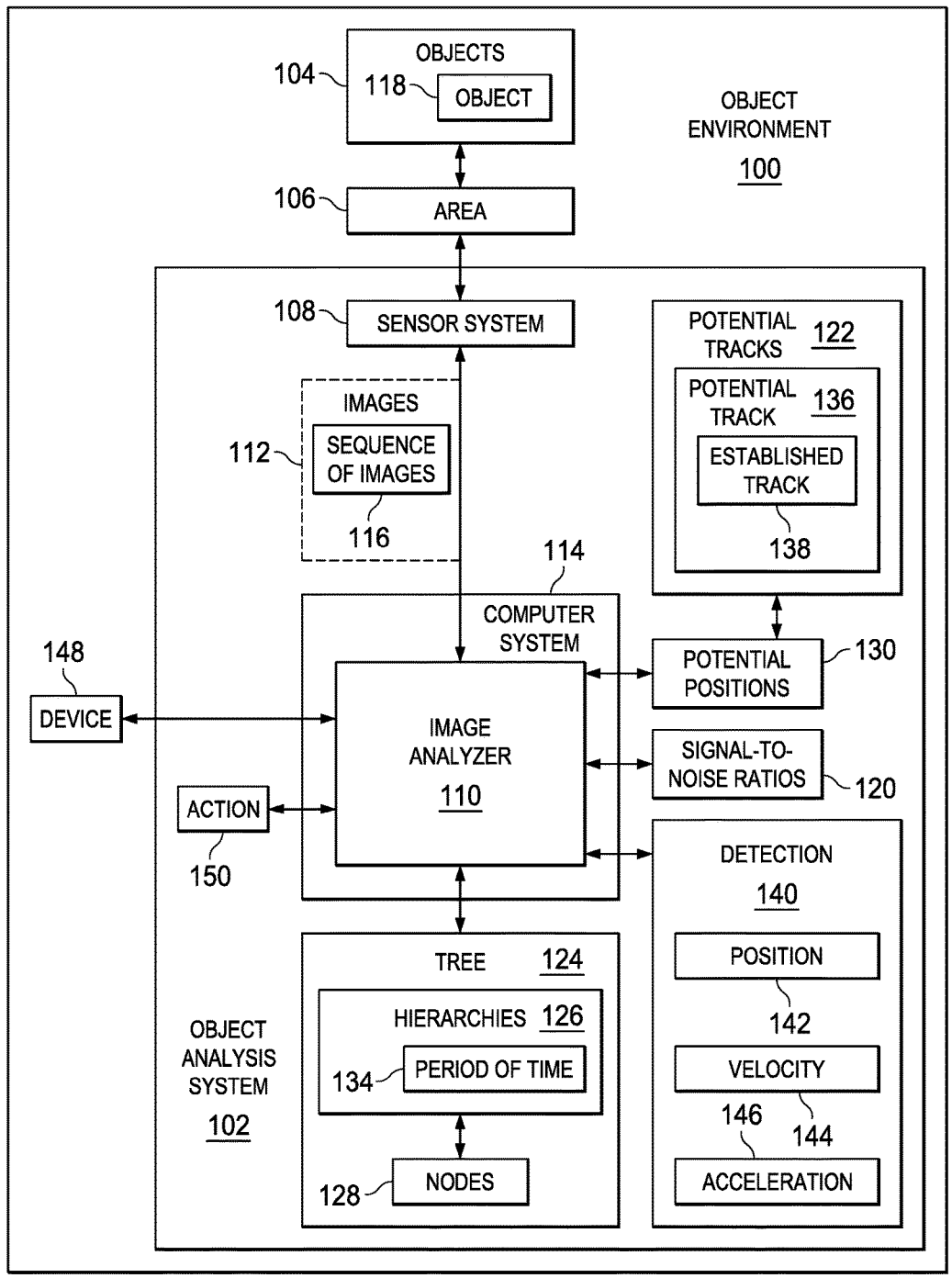
FIG. 1 is an illustration of a block diagram of an object environment in accordance with an illustrative embodiment.

With reference now to the figures and, in particular, with reference to FIG. 1, an illustration of a block diagram of an object environment is depicted in accordance with an illustrative embodiment. In this illustrative example, object environment 100 includes object analysis system 102, which performs an analysis of objects 104 in object environment 100. For example, object analysis system 102 may detect objects 104 in object environment 100. Object analysis system 102 also may track the movement of objects 104 in object environment 100.

In this illustrative example, objects 104 move in area 106 in object environment 100. Objects 104 are objects that move in this example and may take various forms. For example, an object in objects 104 may be selected from one of a person, a car, a truck, an animal, an aircraft, a train, or some other suitable object. Area 106 may be, for example, selected from one of a park, a road, a city block, a meadow, a forest, a stadium, a yard, an atrium, a room, a river, a lake, a portion of the sky, or some other suitable area of interest in which analysis of objects 104 is desired.

As depicted, object analysis system 102 performs at least one of detection or tracking of objects 104 within area 106. For example, object analysis system 102 may perform at least one of detection or tracking of objects moving within area 106. Objects moving within area 106 may move into area 106, out of area 106, through area 106, or only inside area 106.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, object analysis system 102 includes a number of different components. As depicted, object analysis system 102 includes sensor system 108 and image analyzer 110. As used herein, a "number of items" is one or more items. For example, "a number of components" is one or more components.

Sensor system 108 is a hardware system and generates images 112 of area 106. Sensor system 108 may include at least one of a camera, a digital camera, a traffic camera, a video camera, an Internet protocol (IP) camera, a pan-tilt-zoom (PTZ) camera, a stereo camera, a visible light camera, a thermographic camera, or some other suitable type of device that generates images 112.

Images 112 are sequential in this particular example. Images 112 may be generated by sensor system 108 on a periodic basis. For example, images 112 may take the form of frames for a video of area 106. In other illustrative examples, images 112 may be still images generated over time.

A frame is an image in a video. For example, in a stream of video, a frame for the video is a group of pixels for an image for a particular point in time in the video.

Pixels are the smallest unique components of an image. Pixels have intensity for a type of radiation. The type of radiation is at least one of visible light, infrared light, or other suitable type of radiation. For example, when the type of radiation is visible light, the intensity may be values that describe a particular color for the pixel in the image.

In this example, these values for the particular color are at least one of a level of red, a level of blue, a level of green, a combination of levels of red, green, and blue, or other suitable combination of different levels of colors for different coloring systems. A level of a color is an amount of intensity for the color selected from a range of values. The values for intensity may also be over a grayscale when the images are grayscale images in other illustrative examples.

As used herein, "a group of" items is one or more items. For example, "a group of pixels" is one or more pixels.

As depicted, sensor system 108 sends images 112 to image analyzer 110. In this illustrative example, image analyzer 110 detects objects 104 in area 106 using images 112. Image analyzer 110 may also track objects 104 using images 112. Image analyzer 110 may use some or all of images 112. For example, some of images 112 may be discarded for quality or other reasons.

Further, images 112 may be raw images, preprocessed, or some combination thereof. For example, at least one of sensor system 108 or image analyzer 110 may perform preprocessing of images 112. This preprocessing may include filtering, removing low-frequency background noise, normalizing intensity, masking portions of the images, removing hotspots, or some other type of preprocessing.

Image analyzer 110 may be implemented in software, hardware, firmware or a combination thereof. When software is used, the operations performed by image analyzer 110 may be implemented in program code configured to run on hardware, such as a processor unit. When firmware is used, the operations performed by image analyzer 110 may be implemented in program code and data and stored in persistent memory to run on a processor unit. Additionally, a temporary memory, such as a random access memory (RAM), may be used to implement a temporary image buffer to store sequences of images. When hardware is employed, the hardware may include circuits that operate to perform the operations in image analyzer 110.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

As depicted, image analyzer 110 may be implemented in computer system 114. In this illustrative example, computer system 114 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

During operation in one illustrative example, image analyzer 110 receives images 112 from sensor system 108 as sequence of images 116. In one illustrative example, image analyzer 110 analyzes sequence of images 116 for object 118 in objects 104. As depicted, image analyzer 110 analyzes sequence of images 116 to perform at least one of detecting or tracking object 118.

In the illustrative example, image analyzer 110 identifies signal-to-noise ratios 120 for potential tracks 122 using tree 124 and sequence of images 116. As depicted, tree 124 has hierarchies 126 of nodes 128 identifying potential positions 130 for object 118 over period of time 134. As depicted, each hierarchy in hierarchies 126 of nodes 128 represents a time in period of time 134, and potential positions 130 in tree 124 form potential tracks 122 for object 118 over period of time 134. Each time is for an image in sequence of images 116.

Image analyzer 110 selects potential track 136 from potential tracks 122 as established track 138 for object 118 using signal-to-noise ratios 120. Established track 138 is a track in potential tracks 122 that is identified as the most likely track for object 118.

Image analyzer 110 generates detection 140 of object 118. In this example, detection 140 may include information selected from at least one of position 142, velocity 144, acceleration 146, or other suitable information.

Image analyzer 110 reports detection 140 of object 118 to device 148. Device 148 may be, for example, a display system, an object recognition system, a guidance system for a platform, a computer, a tracking system, a control center, or some other suitable device. As depicted, device 148 may be hardware, software, or some combination thereof. The platform may be, for example, a surface ship, an unmanned aerial vehicle, an unmanned ground vehicle, an unmanned ship, a tank, a missile, a spacecraft, a space station, a satellite, a submarine, and other suitable platforms. Thus, as depicted, object analysis system 102 functions as a multi-hypothesis moving object detection system.

With detection 140, image analyzer 110 may perform action 150. In this illustrative example, action 150 may be selected from one of generating an alert, generating a warning, sending a message, displaying an indicator on a display system, displaying an image from sequence of images 116 with an indicator identifying position 142 of object 118 in the image, identifying object 118, identifying a track for object 118, changing movement of a platform, or other suitable actions.

In another illustrative example, action 150 may be performed by an operator. For example, a human operator may send instructions to intercept object 118, perform further surveillance of object 118, send instructions to ground forces, or other suitable actions.

Figure 2:
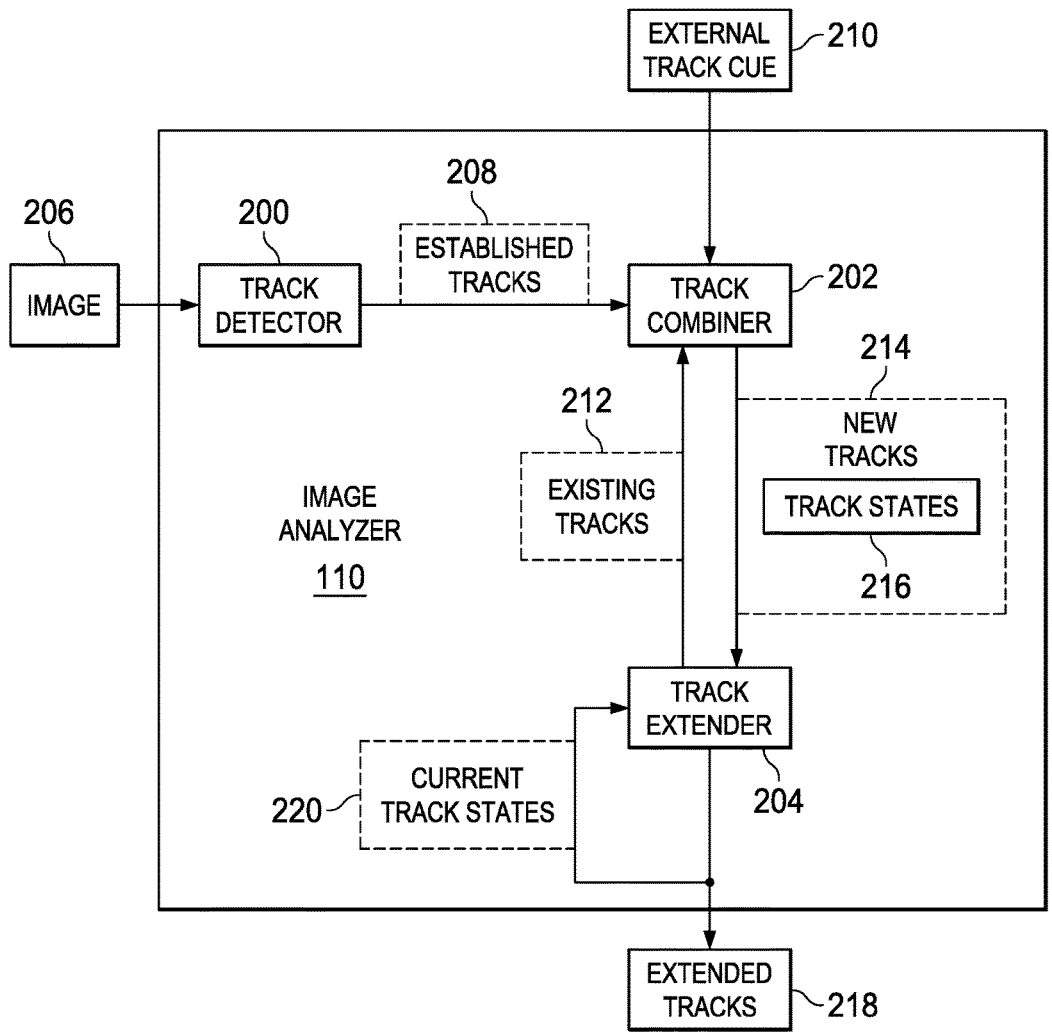
FIG. 2 is an illustration of a block diagram of an image analyzer in accordance with an illustrative embodiment.

With reference next to FIG. 2, an illustration of a block diagram of an image analyzer is depicted in accordance with an illustrative embodiment. As depicted, examples of components that may be used to implement image analyzer 110 in FIG. 1 are shown.

In this illustrative example, image analyzer 110 has a number of different components. As depicted, image analyzer 110 includes track detector 200, track combiner 202, and track extender 204.

As depicted, track detector 200 identifies a number of established tracks 208 when image 206 is received. Track detector 200 may use the entire image or a portion of image 206 in identifying the number of established tracks 208. In some illustrative examples, only a portion of image 206 is received for processing.

Track detector 200 sends established tracks 208 to track combiner 202. Track combiner 202 functions as an interface between track detector 200 and track extender 204. Track combiner 202 is configured to receive established tracks 208 output by track detector 200 and external track cue 210 as inputs. Track combiner 202 also receives existing tracks 212 from track extender 204.

External track cue 210 may be a track or position identified by human operator or other hardware or software components. External track cue 210 is sent to track extender 204 for processing.

Track combiner 202 determines whether established tracks 208 are new tracks 214 or part of or located in existing tracks 212. Track combiner 202 compares existing tracks 212 to established tracks 208 in making this determination. When new tracks 214 are identified, new tracks 214 are sent to track extender 204.

Track extender 204 tracks an object detected in image 206. This tracking may be performed using track states 216 in new tracks 214 received from track combiner 202. Track states 216 may be identified by at least one of track detector 200 or track combiner 202. Track states 216 may include at least one of position 142, velocity 144, or acceleration 146 seen in block form in FIG. 1 for the latest detection of an object.

As depicted, track extender 204 determines whether new tracks 214 are extensions of existing tracks 212 or if new tracks 214 are entirely new tracks that are not associated with any of existing tracks 212. If new tracks 214 are extensions of existing tracks 212, new tracks 214 are added onto existing tracks 212 to form extended tracks 218. If new tracks 214 are entirely new tracks, new tracks 214 are added to existing tracks 212 as separate tracks in extended tracks 218.

In this manner, track extender 204 is configured to extend existing tracks 212 to form extended tracks 218 with moving objects. The extension of existing tracks 212 by track extender 204 occurs even with objects that change speed or direction during times when the signal-to-noise ratio of an object is too low for detection in a single image.

In the illustrative example, track extender 204 may update track states 216 and include updates to track states 216 in extended tracks 218 to form current track states 220. Further, current track states 220 may be used by track extender 204 in processing new tracks 214 that are received. Current track states 220 may be used in identifying which portion or portions of image 206 should be used in identifying tracks.

In one illustrative example, one or more technical solutions are present that overcome a technical problem with detecting moving objects. As a result, one or more technical solutions may provide a technical effect of increasing the accuracy of detecting moving objects. One or more of the technical solutions create a tree identifying potential positions for an object over a period of time for a sequence of images. In other words, the technical solutions do not attempt to detect the object using a current image and do not assume that a constant object trajectory is present. The illustrative examples employ signal integration hypotheses over a time series of frames that are maintained in a tree form and are used to determine the best possible object movement.

One or more illustrative examples incorporate a sequence of images received over time to help increase the accuracy in decisions about at least one of detecting or tracking an object. The detection of the object is not made at the time of the current image. Instead, the detection is made by image analyzer 110 for a prior time for a prior image in the sequence of images, rather than the current time for the current image that has been received. In this manner, more images may be used to detect an object for the prior time.

With the analysis up to the current time, an increased accuracy in detecting an object at the prior time may occur with more images being available for analysis. One or more of the technical solutions in the illustrative examples increase the number of frames that may be used by eliminating assumptions used by current techniques, such as constant velocity and constant trajectory.

As a result, computer system 114 shown in block form in FIG. 1 operates as a special purpose computer system in which image analyzer 110 in computer system 114 enables a more accurate detection of objects 104 shown in block form in FIG. 1. In particular, image analyzer 110 transforms computer system 114 into a special purpose computer system, as compared to currently available general computer systems that do not have image analyzer 110.

The illustration of object environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although device 148 shown in block form in FIG. 1 is shown as a component outside of object analysis system 102, device 148 may be part of object analysis system 102 in other illustrative examples. In another illustrative example, object analysis system 102 may be associated with a platform that performs action 150 shown in block form in FIG. 1 based on the operation of object analysis system 102 to generate detection 140. In another illustrative example, sensor system 108 shown in block form in FIG. 1 may be located in the same location or different location from image analyzer 110. In another example, device 148 may perform action 150.

Figure 3:
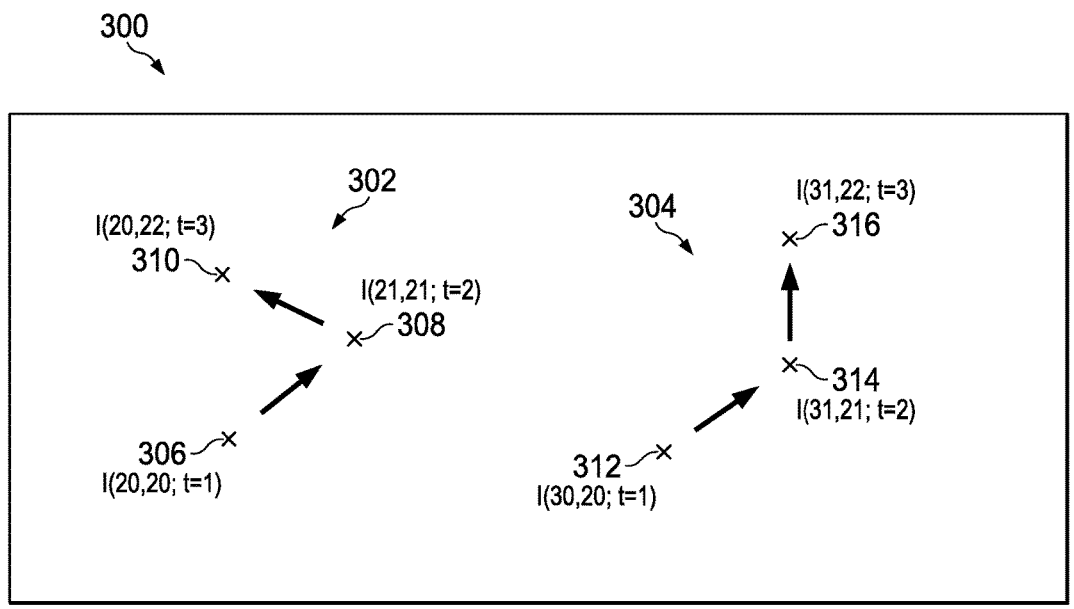
FIG. 3 is an illustration of an image in accordance with an illustrative embodiment.

With reference to FIG. 3, an illustration of an image is depicted in accordance with an illustrative embodiment. In this example, image 300 is an example of image 206 shown in block form in FIG. 2. Image 300 is an image in which an object is likely to be located.

In this depicted example, the position of an object located at a pixel in image 300 is represented as x and y coordinates in image 300. Hypothetical object movements in image 300 may be described by x and y coordinate translations in image 300 without knowing the actual position of the object. The movement of the object in the image may also be referred to as translation of the object. The pixel may represent the object entirely or a center of the object in these examples.

As depicted, image 300 includes track 302 and track 304. For example, the process may operate to detect track 302 for a first object that starts at position 306, where x=20 and y=20 in image 300 at time t=1 is represented as I(20,20; t=1). The object moves to position 308, I(21,21; t=2), and then to position 310, I(20,22; t=3). Also, the process detects track 304 for a second object that moves from position 312, I(30,20; t=1) to position 314, I(31,21,t=2), and then to position 316, I(31,22; t=3).

Prior knowledge of possible object trajectory is absent in this example. As a result, a hypothesis space is developed that contains all possible x and y coordinate translations over time. The hypothesis is the space encompassing all possible movements of an object over a period of time.

For example, if the object moves no more than 1 pixel from image to image, and decision period is set to 3 time steps. The time step may be based on the time between images. The time step may be, for example, 1 millisecond, 1.5 milliseconds, 3 seconds, or some other suitable period of time. As depicted, nine possible movements are present per image pixel position x,y from time t=1 to time t=2.

Possible movements from time t=1 to time t=2 are: I(x,y; t=1)→I(x,y; t=2); I(x,y; t=1)→I(x,y−1; t=2); I(x,y; t=1)→I(x,y+1; t=2); I(x,y; t=1)→I(x−1,y; t=2); I(x,y; t=1)→I(x−1,y+1; t=2); I(x,y; t=1)→I(x−1,y−1; t=2); I(x,y; t=1)→(x+1,y; t=2); I(x,y; t=1)→(x+1,y−1; t=2); and I(x,y; t=1)→(x+1,y+1; t=2).

Further, nine additional movements are present from time t=2 to time t=3 for each hypothesis generated for the time step from time t=1 to time t=2. For example, the hypothesis for one of the positions spans nine additional possible movements from time t=2 to time t=3 as follows: I(x,y; t=1)→I(x+1,y+1; t=2)→I(x,y; t=3); I(x,y; t=1)→I(x+1,y+1; t=2)→I(x,y−1; t=3); I(x,y: t=1)→I(x+1,y+1; t=2)→I(x,y+1; t=3); I(x,y; t=1)→I(x+1,y+1; t=2)→I(x−1,y; t=3); I(x,y; t=1)→I(x+1,y+1; t=2)→I(x−1,y−1; t=3); I(x,y; t=1)→I(x+1,y+1; t=2)→I(x−1,y+1; t=3); I(x,y; t=1)→I(x+1,y+1; t=2)→I(x+1,y; t=3); I(x,y; t=1)→I(x+1,y+1; t=2)→I(x+1,y−1; t=3); and I(x,y; t=1)→I(x+1,y+1; t=2)→I(x+1,y+1; t=3).

As the number of time steps increases, the number of hypothesis for positions of the object per pixel increases. For example, with a single time step, the number of hypothesis is 9; with two time steps, the number of hypothesis is 81; and with three time steps, the number of hypothesis is 729. These different possibilities for the movement of an object form a translational hypothesis for potential tracks 122 shown in block form in FIG. 1.

Figure 4:
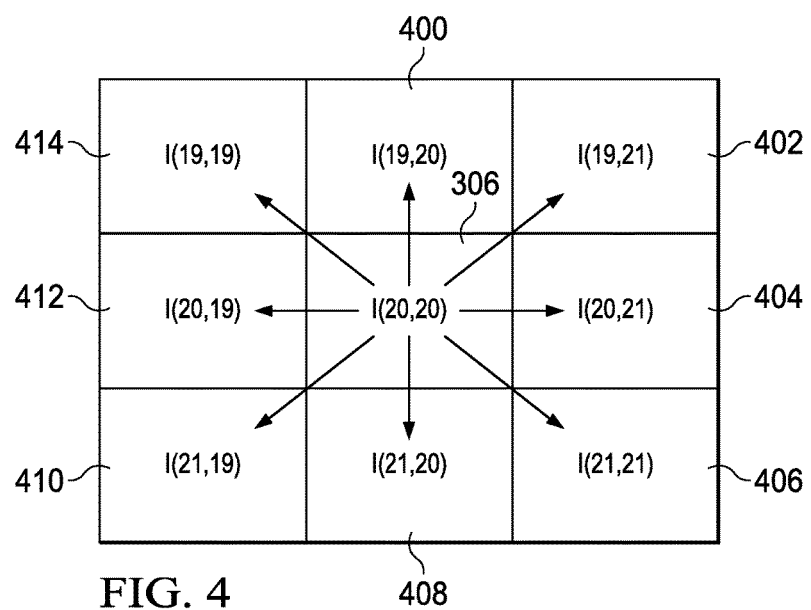
FIG. 4 is an illustration of a possible movement of an object in accordance with an illustrative embodiment.

Turning now to FIG. 4, an illustration of a possible movement of an object is depicted in accordance with an illustrative embodiment. Potential movements from position 306 in track 302 in image 300 in FIG. 3 are shown.

These potential movements are based on the track state at time k as the expected position at time k of the object. The potential movements are for possible movements of object from time k to time k+1. As depicted, the object state at time k of image I is at a pixel at position 306, I(20,20, k). This illustrative example assumes a state velocity covariance at each time step is from −1 pixel per second to +1 pixel per second for simple illustration purposes. FIG. 4 shows the possible movements from a pixel located at position 306, I(20,20, k) for time k+1, which is one time step from time k. As depicted, the possible movements of the object in one time step from time k to time k+1 may be to one of position 400, position 402, position 404, position 406, position 408, position 410, position 412, or position 414.

Figure 5:
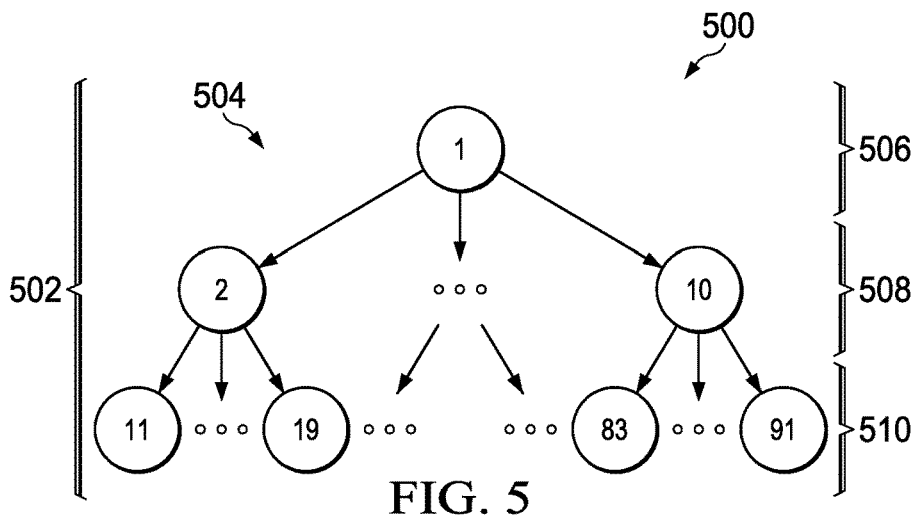
FIG. 5 is an illustration of a tree in accordance with an illustrative embodiment.

Turning now to FIG. 5, an illustration of a tree is depicted in accordance with an illustrative embodiment. Tree 500 is an example of one implementation of tree 124 shown in block form in FIG. 1. As depicted, tree 500 has hierarchies 502 of nodes 504. Hierarchies 502 include hierarchy 506, hierarchy 508, and hierarchy 510.

Nodes 504 in tree 500 include nodes 1-91. However, only node 1, node 2, node 10, node 11, node 19, node 83, and node 91 in FIG. 5 are shown for purposes of illustrating the structure of tree 500. The other nodes present in tree 500 are not shown in this illustration to avoid obscuring the description of the manner in which tree 500 is used to represent the potential positions of the object.

Nodes 504 represent potential positions of the object over a period of time. Each hierarchy in hierarchies 502 represents a time step in a period of time. Each node in nodes 504 represents potential positions of the object. The path through nodes 504 forms a hypothesis for the movement of the object over a period of time. By analyzing the images for the nodes in each path, a detection of the object may be made over a sequence of images. Further, the movement may be used to identify tracks for the object when the object is detected.

In this illustrative example, each hierarchy in hierarchies 502 represents a time. Time is with respect to when an image was generated. For example, hierarchy 506 represents time k, hierarchy 508 represents time k+1, and hierarchy 510 represents time k+2.

As additional images are received, additional hierarchies of nodes 504 are added to tree 500 to maintain all possible movements of an object over a period of time. As a result, tree 500 may grow exponentially over time.

In the illustrative example, hypothesis selection is performed and tree 500 is pruned. Pruning of tree 500 reduces the amount of storage space needed to maintain tree 500. For example, N-pruning may be performed on tree 500. As depicted, N represents the number of images needed to make a hypothesis selection. If the maximum depth for tree 500 is set to 3, the maximum number of hierarchies that is maintained in tree 500 is 3.

As depicted, the selection of a value for N depends on the type of application for the detection process. Also, the selection may depend on a delay in decision-making that the application can tolerate to operate as desired. For example, one factor is the delay in decision-making, which is N−1 time steps. A larger value for N includes more images in the hypotheses being present during decision-making. The larger value of N, however, defers reporting detection by N−1 time steps.

Another factor includes the level of performance. This factor includes run time and memory performance. As the value of N increases, the decision increases in accuracy with hypotheses being considered in decision-making. The increase in N, however, increases processing resources and memory needed.

In this example, reporting the position of an object is deferred by N−1. In this example, the deferral is 2 images in a sequence of images. This deferral may be also referred to as a delay in the time steps for when a hypothesis is selected. In other words, the hypothesis is not selected using the most recent image received.

As depicted, pruning is performed by removing all the siblings in the same level as the parent node. In this example, the hypothesis for the movement of the object is the path through node 1, node 2, and node 11. At time k+2 for hierarchy 510, the nodes in the path to node 11 from node 1 are identified as having the best signal-to-noise ratio in this illustrative example. As a result, node 1 is the root node and node 2 is the parent node. The root node, node 1, is removed along with all of the siblings, nodes 3-10, of the parent node, node 2. Node 2 becomes the new root node.

Figure 6:
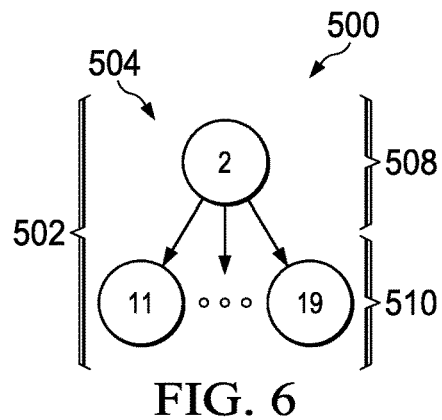
FIG. 6 is an illustration of a pruned tree in accordance with an illustrative embodiment.

With reference now to FIG. 6, an illustration of a pruned tree is depicted in accordance with an illustrative embodiment. In this depicted example, tree 500 is now shown in a pruned form with the removal of some of nodes 504 from a selection of a hypothesis for the movement of an object. In this manner, fewer nodes in tree 500 are needed to identify the position and movement of an object.

Figure 7:
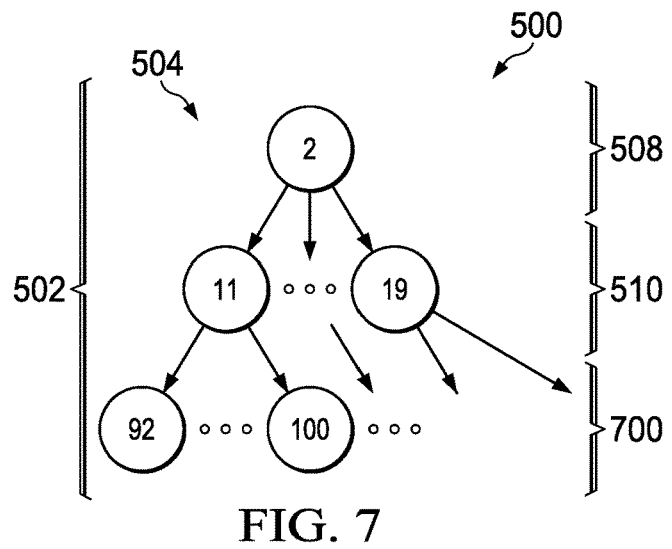
FIG. 7 is an illustration of a tree with the addition of a hierarchy in accordance with an illustrative embodiment.

Turning next to FIG. 7, an illustration of a tree with the addition of a hierarchy is depicted in accordance with an illustrative embodiment. In this example, hierarchy 700 is added for time k+3 when another image in the sequence of images is received.

The process of selecting a hypothesis may be performed along with pruning tree 500. In this manner, adding hierarchies, selecting hypotheses, and pruning of tree 500 may continue as images are received in a manner that reduces the amount of storage space needed to maintain tree 500 in detecting and tracking objects if the pruning of tree 500 was not performed.

With reference now to FIGS. 8-15, an illustration of a tree and tables of hypotheses for the movement of an object using the tree is depicted in accordance with an illustrative embodiment. These figures are used to illustrate how a hypothesis may be selected using a delay, with respect to the current image. In other words, the selection of a path in the tree for the position of the object is made up to a time that is prior to the time for the current image. This delay is one technical solution in the illustrative examples which makes identifying the movement of the object occur with fewer errors as compared to currently used techniques. This delay may increase the accuracy in detecting objects with movement that is not constant.

Figures 8, 9:
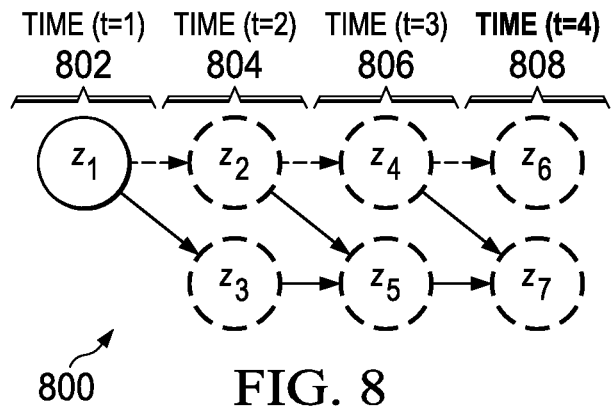
FIG. 8 is an illustration of a tree in accordance with an illustrative embodiment.
FIG. 9 is an illustration of a table of hypotheses for potential paths for an object in accordance with an illustrative embodiment.

With reference first to FIG. 8, an illustration of a tree is depicted in accordance with an illustrative embodiment. Only a portion of tree 800 is depicted for purposes of illustrating the manner in which a hypothesis for the movement of an object may be created and selected.

Tree 800 depicts potential positions for the object over time in tree 800. The depiction of these potential positions forms a hypothesis for the movement of the object. In this manner, images may be selected for processing to detect the presence of the object when the object has a signal-to-noise ratio that is insufficient for detecting the object within a single image. The processing also may include tracking the object.

In this illustrative example, tree 800 has node Z1, node Z2, node Z3, node Z4, node Z5, node Z6, and node Z7. In this example, only some of the nodes in tree 800 are shown for some hypotheses for purposes of illustration. In the illustrative example, as described above, a hypothesis is present for every potential movement of an object, resulting in many more paths than shown that could be candidates for the potential tracks for the object.

Tree 800 has hierarchy 802, hierarchy 804, hierarchy 806, and hierarchy 808. Hierarchy 802 includes node Z1 and represents time t=1; hierarchy 804 includes nodes Z2 and Z3 and represents time t=2; hierarchy 806 includes node Z4 and node Z5 and represents time t=3; and hierarchy 808 includes node Z6 and node Z7 and represents time t=4.

Paths are identified through tree 800 for different potential movements of an object. Each path through tree 800 from time t=1 to time t=4 represents a potential track for the object at time t=4.

The signal-to-noise ratio is generated for each potential path. In the illustrative example, the signal-to-noise ratio is generated using the images corresponding to each node. In using the images, a region may be selected within the image that encompasses the object. The object may be located centrally within the region.

In another illustrative example, the entire image may be used. When the entire image is used, each time step may result in a shifting of the image by one pixel to represent a new position of the object in the new image when the object is assumed to move one pixel per time step. The shifting may remove a row of pixels, a column of pixels, or some combination thereof when the movement of the object is assumed to be up to one pixel for each image. If the movement is more than one pixel, the shifting of the pixel could be greater than one pixel.

As depicted, hierarchy 802 has image data based on a first image in a sequence of images generated at time t=1; hierarchy 804 has image data based on a second image in a sequence of images generated at time t=2; hierarchy 806 has image data based on a third image in a sequence of images generated at time t=3; and hierarchy 808 has image data based on a fourth image in a sequence of images generated at time t=4.

In this illustrative example, the data may be a region in the image or a shifted version of the image. The region is selected to encompass the potential position of the object for a particular node. When the image is shifted, the shift in the image represents the position for the object for the particular node.

Turning to FIG. 9, an illustration of a table of hypotheses for potential paths for an object is depicted in accordance with an illustrative embodiment. Table 900 illustrates 4 hypotheses for the paths that the object may take through tree 800 in FIG. 8 in row 902, row 904, row 906, and row 908. Column 910 is an identification of the hypothesis. Column 912 identifies the path for the hypothesis, and column 914 is the signal-to-noise ratio (SNR) for the hypothesis.

In this illustrative example, hypothesis 1 in row 902 has the highest signal-to-noise ratio value. In this example, the positions of the nodes for this path form the potential track that is selected at time t=3. However, in this example, the detection of the object is only made with respect to the movement of objects from time t=1 to time t=2.

This path is formed by node Z1 and node Z2. In other words, the detection of the position of the object is not made all the way up to the current time in which the latest image has been received. The detection is made with a delay of 2 time steps in this illustrative example. The delay could be any number of time steps other than 2, depending on the particular implementation. The delay allows for determining whether a particular hypothesis is correct as more images are received. As a result, more images may be considered as compared to currently used techniques.

Figures 10, 11:
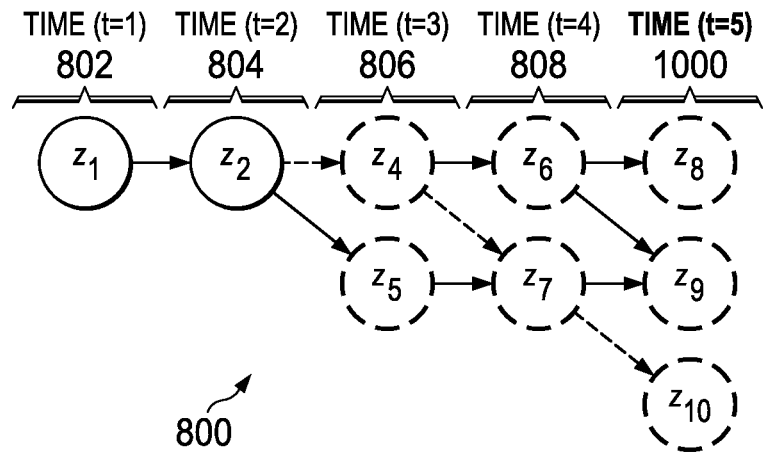
FIG. 10 is an illustration of a tree in accordance with an illustrative embodiment.
FIG. 11 is an illustration of a table of hypotheses for potential paths for an object in accordance with an illustrative embodiment.

Turning now to FIG. 10, an illustration of a tree is depicted in accordance with an illustrative embodiment. In this example, the selection of a path for a potential track for an object is node Z1 and node Z2. In this example, new images have been received for time t=5. Nodes are added to hierarchy 1000 for time t=5. As depicted, hierarchy 1000 includes node Z8, node Z9, and node Z10.

With reference now to FIG. 11, an illustration of a table of hypotheses for potential paths for an object is depicted in accordance with an illustrative embodiment. Table 1100 depicts 6 hypotheses for paths that the object may take through tree 800 in FIG. 8 in row 1102, row 1104, row 1106, row 1108, row 1110, and row 1112. Column 1114 is an identification of the hypothesis. Column 1116 identifies the path, and column 1118 is the signal-to-noise ratio (SNR).

In this example, hypothesis number 4 in row 1108 has the highest signal-to-noise ratio. The detection of the object is made up to time t=3 using hypothesis number 4 in row 1108.

Figures 12, 13:
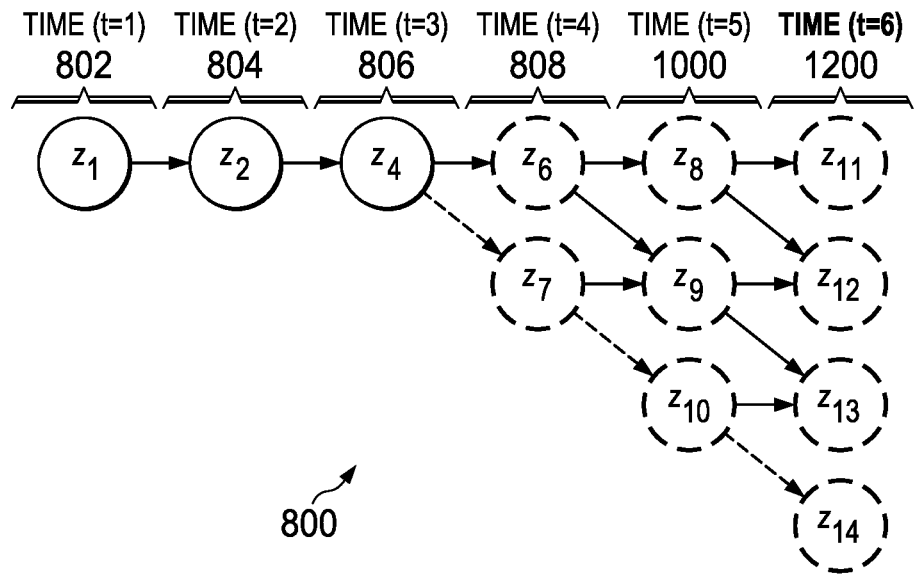
FIG. 12 is an illustration of a tree in accordance with an illustrative embodiment.
FIG. 13 is an illustration of a table of hypotheses for potential paths for an object in accordance with an illustrative embodiment.

Turning to FIG. 12, an illustration of a tree is depicted in accordance with an illustrative embodiment. In this example, the path through tree 800 identified for the potential track of the object is node Z1, node Z2, and node Z4. In this example, a new image is received for time t=6. Nodes are added to hierarchy 1200 for time t=6. As depicted, hierarchy 1200 includes node Z11, node Z12, node Z13, and node Z14.

With reference now to FIG. 13, an illustration of a table of hypotheses for potential paths for an object is depicted in accordance with an illustrative embodiment. Table 1300 depicts 6 hypotheses for paths that the object may take through tree 800 in FIG. 8 in row 1302, row 1304, row 1306, row 1308, row 1310, and row 1312. Column 1314 is an identification of the hypothesis. Column 1316 identifies the path, and column 1318 is the signal-to-noise ratio (SNR).

In this example, hypothesis number 6 in row 1312 has the highest signal-to-noise ratio. As depicted, the detection of the object is made up to time t=4 using hypothesis number 6 in row 1312.

Figures 14, 15:
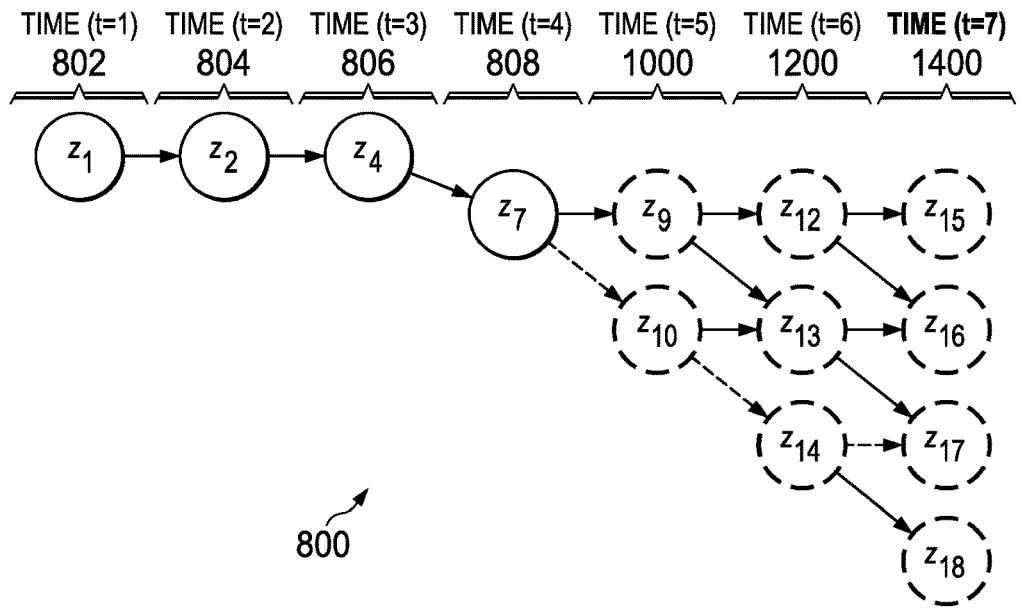
FIG. 14 is an illustration of a tree in accordance with an illustrative embodiment.
FIG. 15 is an illustration of a table of hypotheses for potential paths for an object in accordance with an illustrative embodiment.

Turning now to FIG. 14, an illustration of a tree is depicted in accordance with an illustrative embodiment. In this example, the path through tree 800 identified for the potential track of the object is node Z1, node Z2, node Z4, and node Z7. In this example, a new image is received for time t=7. Nodes are added to hierarchy 1400 for time t=7. As depicted, hierarchy 1400 includes node Z15, node Z16, node Z17, and node Z18.

With reference now to FIG. 15, an illustration of a table of hypotheses for potential paths for an object is depicted in accordance with an illustrative embodiment. Table 1500 depicts 7 hypotheses for paths that the object may take through tree 800 in FIG. 8 in row 1502, row 1504, row 1506, row 1508, row 1510, row 1512, and row 1514. Column 1516 is an identification of the hypothesis. Column 1518 identifies the path, and column 1520 is the signal-to-noise ratio (SNR).

In this example, hypothesis number 6 in row 1512 has the highest signal-to-noise ratio. The detection of the object is made up to time t=5 using hypothesis number 6 in row 1512.

The illustration of the trees and tables of hypotheses for the movement of an object in FIGS. 8-15 are provided only as examples of one manner in which trees and tables may be implemented. For example, other delays in time steps may be used other than a delay of two time steps. In other illustrative examples, the delay may be, for example, 1 time step, 5 time steps, or some other suitable number of time steps. By increasing the number of time steps in the delay, more images may be taken into account in detecting an object that moves. Further, pruning of tree 800 in FIG. 8 may be performed as described in other illustrative examples.

Figure 16:
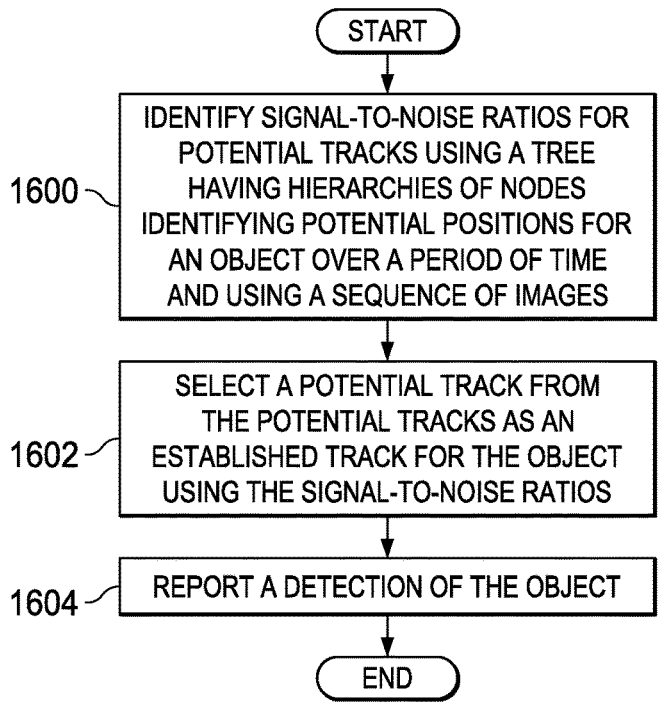
FIG. 16 is a high-level flowchart of a process for analyzing a sequence of images in accordance with an illustrative embodiment.

Turning next to FIG. 16, a high-level flowchart of a process for analyzing a sequence of images is depicted in accordance with an illustrative embodiment. The process in this figure may be implemented in object environment 100 shown in block form in FIG. 1. For example, the process may be implemented in image analyzer 110 in object analysis system 102 shown in block form in FIG. 1.

The process begins by identifying signal-to-noise ratios for potential tracks using a tree having hierarchies of nodes identifying potential positions for an object over a period of time and using a sequence of images (step 1600). Each hierarchy in the hierarchies of nodes represents a time, and the potential positions in the tree form the potential tracks for the object. In other words, the paths through the potential positions are for the potential tracks.

The process selects a potential track from the potential tracks as an established track for the object using the signal-to-noise ratios (step 1602). In step 1602, the process may select the potential track having a highest signal-to-noise ratio in the signal-to-noise ratios. In other illustrative examples, the potential track selected as the established track may be selected using at least one of the signal-to-noise ratios, a track state, an object shape, or some other suitable parameter.

The process reports a detection of the object (step 1604) with the process terminating thereafter. In step 1604, the reporting may report at least one of a latest position, the established track, a direction, a velocity, an acceleration, or some other information. The other information may be about the object, environment, or some other suitable type of information.

For example, the detection may be sent to a device and used to perform one or more actions. The actions may be performed by the device or by a human operator when the device is a display system or some other output device that presents the detection to the human operator.

Figure 17:
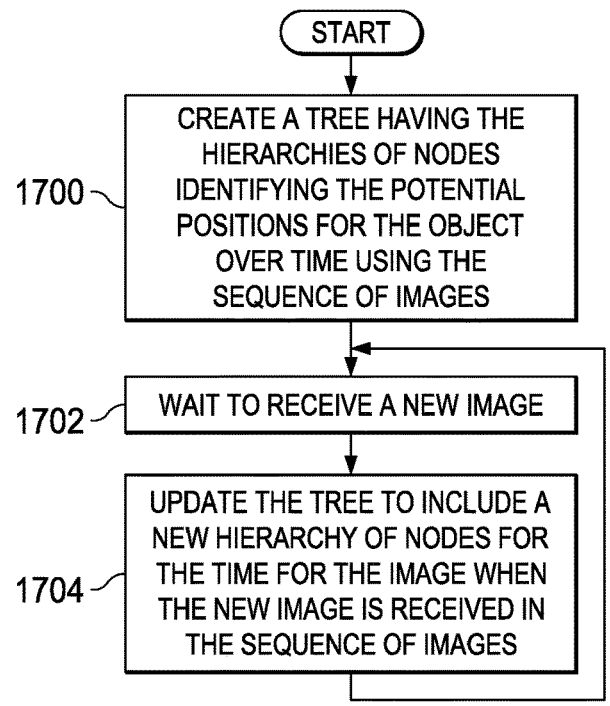
FIG. 17 is a flowchart of a process for managing a tree in accordance with an illustrative embodiment.

With reference next to FIG. 17, a flowchart of a process for managing a tree is depicted in accordance with an illustrative embodiment. The process illustrated in FIG. 17 may be used to manage a tree used in step 1600 in FIG. 16.

The process begins by creating a tree having hierarchies of nodes identifying potential positions for an object over time using a sequence of images (step 1700). The tree in step 1700 may be tree 124 shown in block form in FIG. 1, tree 500 illustrated in FIG. 5, or some other tree that is used to identify the potential positions of a moving object. Each hierarchy in the hierarchies of nodes represents a time. The time may be the time at which an image was generated. The paths through the nodes representing the potential positions in the tree form the potential tracks for the object.

The process waits to receive a new image (step 1702). The process updates the tree to include a new hierarchy of nodes for the time for the image when the new image is received in the sequence of images (step 1704.) The process then returns to step 1702. The time for the image is the time when the image was generated in this example. With this updating of the tree, step 1700, step 1702, and step 1704 may be repeated any number of times using the tree as updated with the new image.

Figure 18:
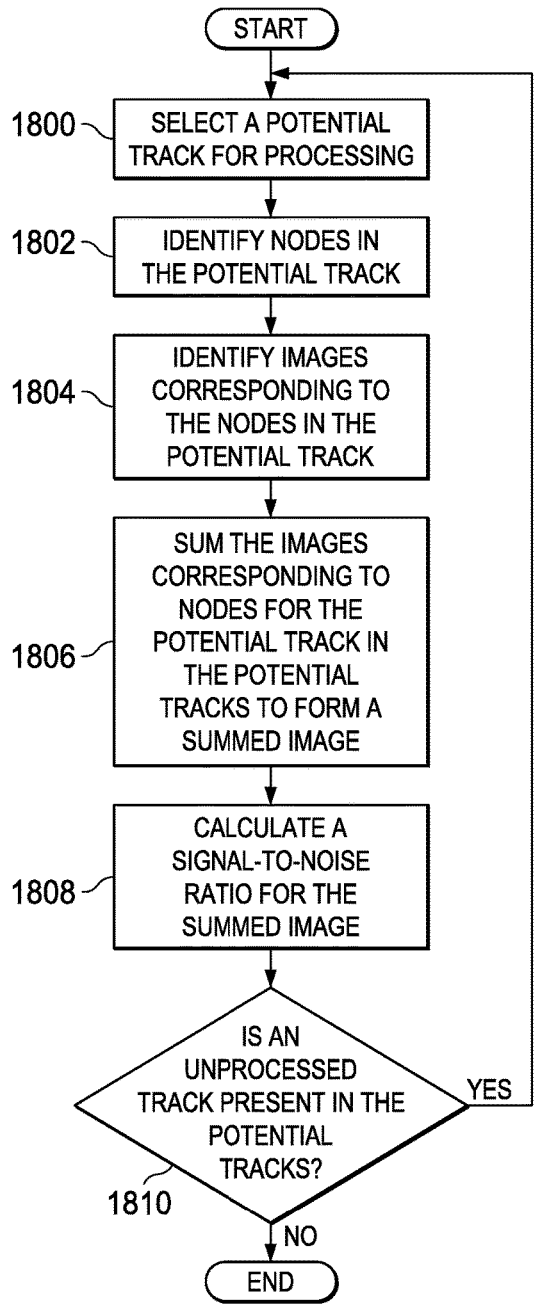
FIG. 18 is a flowchart of a process for identifying signal-to-noise ratios for potential tracks in accordance with an illustrative embodiment.

With reference next to FIG. 18, a flowchart of a process for identifying signal-to-noise ratios for potential tracks is depicted in accordance with an illustrative embodiment. The process illustrated in FIG. 18 is an example of one implementation for step 1600 in FIG. 16.

The process begins by selecting a potential track for processing (step 1800). The process then identifies nodes in the potential track (step 1802). The process then identifies images corresponding to the nodes in the potential track (step 1804).

The process sums the images corresponding to nodes for the potential track in the potential tracks to form a summed image (step 1806). The process then calculates a signal-to-noise ratio for the summed image (step 1808).

A determination is made as to whether an unprocessed track is present in the potential tracks (step 1810). If an unprocessed track is present in the potential tracks, the process returns to step 1800. Otherwise, the process terminates.

Figure 19:
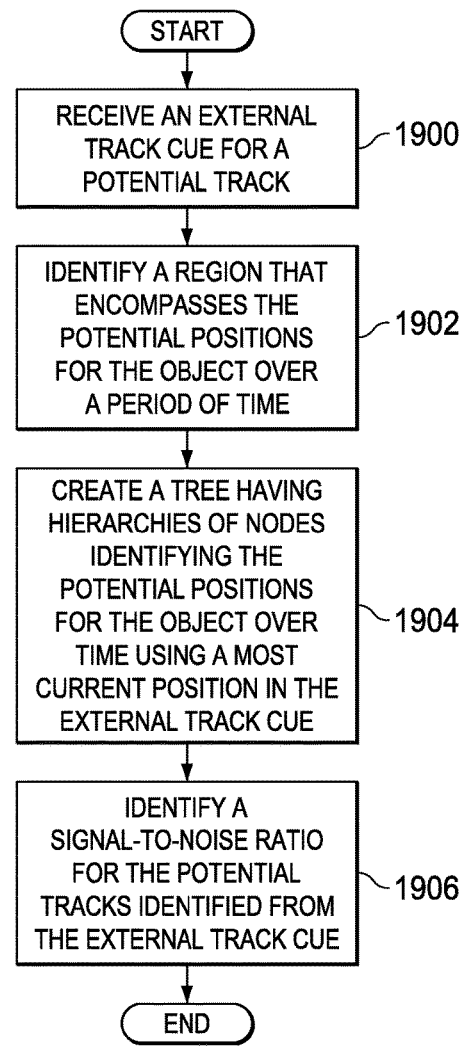
FIG. 19 is a flowchart of a process for processing an external track cue for a potential track in accordance with an illustrative embodiment.

Turning now to FIG. 19, a flowchart of a process for processing an external track cue for a potential track is depicted in accordance with an illustrative embodiment. The process illustrated in FIG. 19 may be implemented in image analyzer 110 shown in block form in FIG. 1.

The process begins by receiving an external track cue for a potential track (step 1900). This external track cue may be the potential track entered by a human operator. For example, the potential track may be a state of the object. The state includes one or more positions and also may include velocity, acceleration, or some combination thereof for the object.

The process then identifies a region that encompasses the potential positions for the object over a period of time (step 1902). The process creates a tree having hierarchies of nodes identifying the potential positions for the object over time using a most current position in the external track cue (step 1904). Each hierarchy is based on an image received to a particular time. The process then identifies a signal-to-noise ratio for the potential tracks identified from the external track cue (step 1906), with the process terminating thereafter.

Figure 20:
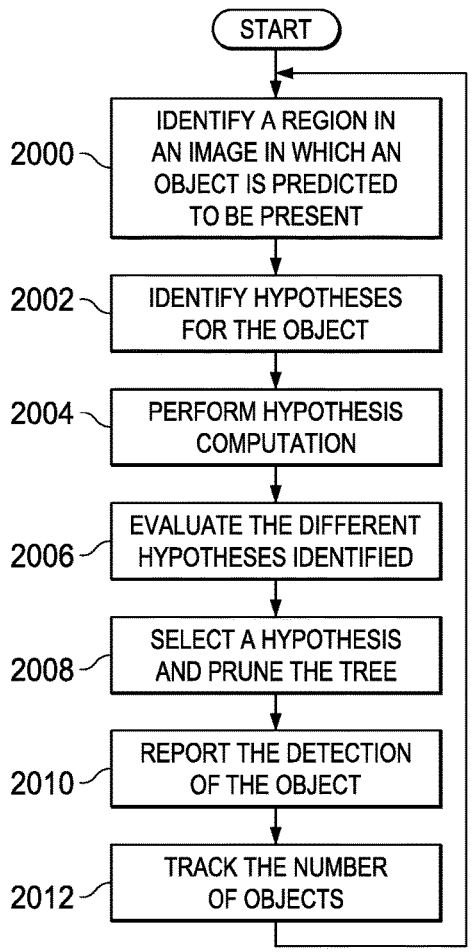
FIG. 20 is a flowchart of a process for extending tracks from an external track cue in accordance with an illustrative embodiment.

With reference next to FIG. 20, a flowchart of a process for extending tracks from an external track cue is depicted in accordance with an illustrative embodiment. The process illustrated in FIG. 20 may be implemented in track extender 204 in response to receiving external track cue 210 shown in block form in FIG. 2.

The process begins by identifying a region in an image in which an object is predicted to be present (step 2000). Given the track state of the object at time k−1, the predicted state for an object at time k may be extrapolated using a Kalman filter.

In this illustrative example, tracking is performed using a linear model:

$$x(k)=Ax(k-1)+w(k), w(k) \sim N(0,Q)$$

$$y(k)=Hx(k)+v(k), v(k) \sim N(0,R),$$

where x is the state vector; y is the output vector; A is the system matrix; k is time; H is the output matrix; w is the process noise assumed to follow a zero mean multivariate normal distribution with covariance Q denoted by (0,Q); and v is the measurement noise assumed to be a zero mean Gaussian white noise with covariance R denoted by N(0,R).

If the track state of the object at time k−1 is known, the track state at time k and the covariance at time k can be obtained by the following equations:

$$\hat{x}(k)=A\hat{x}(k-1)$$

$$P(k)=AP(k-1)A^T+Q,$$

where k is time; $\hat{x}(k)$ is the predicted state at time step update to time k; A is the system matrix; P(k) is the error covariance matrix (a measure of the accuracy of the state estimate) at time k; T is the matrix transpose operator; and Q is the process noise that is assumed to follow a zero mean multivariate normal distribution. In this example, the dimension of the region is selected to be larger than the covariance matrix of the object track and big enough to cover object movement over the sequence of frames. In the illustrative example, the region may change over time. In other words, the region may change from one image to another image.

The process then identifies hypotheses for the object (step 2002). In step 2002, the hypotheses are for potential movements of object.

The track state at time k is used as the expected position for the object at time k. The potential expected movements for the object at time k+1 may then be identified. For example, if the object occupies a pixel in an image identified from the track state and the object moves one pixel at each time step, the object may move to one of nine possible positions in the neighboring nine pixels in the image. Each one of those nine possible positions also has an additional nine possible positions for movement of the object at time k+2.

In the illustrative example, the hypothesis for the movement of the object over time is represented in a tree, such as tree 124 shown in block form in FIG. 1 or tree 500 illustrated in FIG. 5. Each number of nodes in a path through the tree is a hypothesis containing the possible movements of the object over a period of time that is a sequence of time steps.

As part of the hypothesis formation in step 2002, the process assumes that at each time step, the image has already been background subtracted, resulting in a difference image D. Known background estimation techniques may be used. For example, the fast approximate power iteration (FAPI) algorithm uses an adaptive subspace tracking approach to perform a running estimate of the background using a sequence of input frames. The difference image D may be further enhanced through match filtering if desirable:

$$\hat{D}[n]=\Sigma_{k=1}^{K}h[n-k]D[k],$$

where h is the match filter that maximizes the output of a signal-to-noise ratio; D is the image; $\hat{D}$ is the filtered output of image D filtered by h; n is the pixel location in the image; k is the pixel location in the filter; and K is the size of the matched filter. The result is a tree identifying all of the possible movements to reach potential positions for the object over a period of time.

The process then performs hypothesis computation (step 2004). In step 2004, the process computes a hypothesis chip, C, for each node in the tree.

The number of hypothesis chips that need to be computed corresponds to number of nodes in the tree. To compute the hypothesis chip, a region, R, of size M×N is chosen. The region may take another shape other than a rectangle. For example, the region may be a pentagon, a triangle, a circle, an irregular shape, or some other suitable shape.

The region is centered at each movement position within the hypothesis. The size of the region can be based on a user preference or can be derived using a Kalman filter's covariance estimates. In general, the region size should be large enough to cover the movement of the object over multiple time steps. Each hypothesis chip, C, then is computed using the following equation:

$$C=1/k\Sigma_{k=1}^{K}R_k,$$

where C is the hypothesis chip; R represents the expected region at time k; and K is the number of time sequences used for signal integration.

In step 2004, object identification is performed on each hypothesis chip using confidence interval testing. This testing includes computing the spatial mean on C using all the pixels except outliers where C(i,j)>T1, where T1 is a threshold for outliers. The mean testing is performed using the following equation:

$$\mu_c=1/N\Sigma_{n=1}^{N}C(n), C(n) \leq T1,$$

where $\mu_c$ is the mean of the hypothesis chip; N is the total number of pixels in the hypothesis chip; C is the hypothesis chip; and n is a pixel location in the hypothesis chip.

Second, the spatial standard deviation used pixels in $\sigma_c$ is computed as follows:

$$\sigma_c = \sqrt{\frac{1}{N}\sum_{n=1}^{N}(C(n)-\mu_c)^2}, \; C(n) \le T1,$$

where $\sigma_c$ is the spatial standard deviation of the hypothesis chip, C; $\mu_c$ is the mean of the hypothesis chip, C; C(n) is the pixel value of the hypothesis chip at pixel location n; n is the pixel location index; and N is the total number of pixels in the hypothesis chip.

If C follows a normal distribution, a z-score may be computed for each pixel on the hypothesis chip, C, using the following equation:

$$Z_s(i,j) = \frac{C(i,j)-\mu_c}{\sigma_c},$$

where i,j are pixel location indices; $\sigma_c$ is the spatial standard deviation of the hypothesis chip; $\mu_c$ is the mean of the hypothesis chip; and $Z_s$ is the z-score of the hypothesis chip.

The z-score measures how far a pixel deviates from the mean. A threshold, T, may be set on the z-score based on confidence interval testing such that if $Z_s(i,j) \ge T$, a detection, is present and if $Z_s(i,j) < T$, a detection, does not occur.

Threshold T can be selected based on preferences on detectability and false alarms. For example, increasing T reduces false alarms in object detection. Reducing T increases the emphasis on detectability but increases false alarms. An increasing T results in fewer false detections being triggered, but increases the difficulty in detecting a low signal-to-noise ratio object. On the other hand, reducing T increases the detection of low signal-to-noise ratio objects, but also increases the probability of false triggers. For low signal-to-noise ratio object detection, $T \ge 2.576$ (99% confidence interval) may be used. In the illustrative example, a low signal-to-noise ratio object is one that has a signal-to-noise ratio that falls below a signal-to-noise ratio of about 3. These types of objects are usually difficult to detect without triggering an undesired amount of false alarms. Basically, any signal that lies outside of the noise confidence interval is considered a detection. The result of the statistical spatial detector is a binary detection mask, DetectionMask(i,j)=1, if detection or 0 otherwise.

Further, in step 2004, spatial clustering is performed on the binary detection mask. Detections that are "connected" (connected by 1's) are clustered to represent a single object. The object position of the cluster is the centroid of the cluster. A threshold on minimum and maximum connected pixels is used to eliminate false triggered detections. Additionally, clusters meeting minimum and maximum requirements are evaluated by "compactness". The equation for compactness is defined as follows:

$$\text{compactness threshold} = \frac{Num \text{ Pixels in Cluster}}{\text{Area of Cluster}}.$$

In this example, false triggers may be reduced by eliminating compact clusters that do not meet the compactness threshold. In this example, the compactness threshold may be selected based on target characteristics. For example, the compactness threshold setting may be from about 0.20 to about 0.80. The compactness threshold is selected to remove unwanted detections of objects that are not of interest. For example, an application may be configured to detect and track tennis ball movements in the tennis court. A tennis ball is considered a small but compact object. However, other small confusers in the scene such as leaves blowing in the area of the tennis court may be detected as unwanted objects. In this example, leaves are less compact than a tennis ball. As result, the higher compactness threshold may be set a value that reduces or eliminates the detection of leaves. The compactness threshold may set to greater than about 0.5.

The process then evaluates the different hypotheses identified (step 2006). In step 2006, scoring is used to evaluate each of the hypotheses. The scoring of the hypotheses may be performed using the signal-to-noise ratios identified for the hypotheses. In other illustrative examples, the scoring of the hypotheses may be made using a combination of signal-to-noise ratios and characteristics of the object. The characteristics of the object that may be considered include at least one of shape, size, color, or other characteristics.

For example, in detecting and tracking the movement of tennis balls on a tennis court, players hitting the tennis ball with tennis racquets are confusers. Other confusers may be, for example, dust generated from ground movement or leaves blowing on the tennis court. In addition to signal-to-noise ratios, characteristics such as shape (degree of roundness of an object), color (degree of yellowness), size (number of pixels comprising an object to exclude large objects, like a human), speed of an object (velocity, acceleration) may be taken into account in a mathematic equation for scoring. For example, the characteristics may be taken into account using a weighted mathematical equation. Score=$F_1 W_1 + F_2 W_2 + \ldots + F_n W_n$ and $W_1 + W_2 + \ldots W_n = 1$ where $F_1 \ldots F_n$ corresponds to n unique sets of features (i.e. SNR, size, shape, etc.), and $W_1 \ldots W_n$ corresponds to individual weights assigned to each unique feature.

In calculating the signal-to-noise ratio, the cluster signal-to-noise ratio can be computed by sorting z-scores of the detected pixels that make up the cluster and then selecting the M highest z-scores. The size of M is selected based on the size of the object. For example, if the object is expected to cover 5 pixels, then M is selected to 5. Next, the mean of the z-scores of the M highest detected pixels in the cluster is identified as follows:

$$SNR_c = 1/M \sum_{m=1}^{M} Z_s(k),$$

where $SNR_c$ is the signal to noise ratio for a cluster; m is the detected pixel in the cluster; M corresponds to the number of the Zs is a z-score; and k is the index for the z-score that contains the M highest z-score values. When multiple clusters are detected, the cluster with the highest signal-to-noise ratio in the region is retained.

In step 2006, the process assigns scores to the different hypotheses based on the signal-to-noise ratio. In assigning the score based on the signal-to-noise ratio, the score may be based on only the signal-to-noise ratio or the signal-to-noise ratio and another characteristic of the object. If an object is detectable in the hypothesis chip, that hypothesis corresponding to the chip is assigned to a score based on the signal-to-noise ratio. If the object is not detectable in that hypothesis chip, that hypothesis is assigned a score of zero.

The process then selects a hypothesis and prunes the tree (step 2008). By maintaining all possible object movements over a time series in a tree form, the process allows for improved detection of an object, the track for an object, or both. All the hypotheses scores are computed at each time step.

The best hypothesis is selected based on the hypothesis having the highest score. This determination is made for each of the time steps. The best hypothesis at each time step is selected for reporting and pruning. In the illustrative examples, the decision is made with the delay to the current time for which an image has been received. For example, the delay may be 1 time step, 2 time steps, 4 time steps, or some other number of time steps.

The numbers of hypotheses grow exponentially for each additional time step. At some point, the number of nodes may be greater than desired with respect to the storage and processing resources. In the illustrative example, pruning the tree may be performed to reduce the number of nodes that are tracked or used in calculations.

For example, N may be the number of frames needed to make a hypothesis selection. In this example, the threshold for N-scan pruning is three. With these parameters, the maximum number of depth of the tree is maintained at three. In other words, the tree has only three hierarchies. Also, this means the decision to report a position of the object is deferred by N−1, which in this case is two frames. Pruning is done by removing all the siblings in the same level as the parent node.

With the pruning of the tree, the amount of resources needed to process the tree is reduced. The pruning also enables deferring an object detection decision until more images are received so that those images can be integrated to produce a better signal-to-noise ratio for object identification before a detection decision is reported, enabling continuous reporting of object detection with N−1 frame delay.

The process reports the detection of the object (step 2010). In other examples, the detection may be performed for more than one object in the region. Alternatively, the detection may be that no object was detected.

At each time step, the best hypothesis is identified. In this illustrative example, the detection of the object includes the state of the object. This state is a current track state for the object in this example. For example, the process may identify track state information for a node in the hierarchies of nodes representing a latest position in the potential track identified for the object.

The detected location at the root node of the tree prior to pruning of the tree is the location that is reported for the detection of the object. The process tracks the number of objects (step 2012). The state of the object in the detection is used to track the object. The detection may be used to extend a current track for the object. In another illustrative example, the detection may not be an extension of an existing track. In this case, a new track is started.

The process returns to step 2000 to identify the region. Step 2000 is repeated using the current track state. The region may be updated using the track state information in the current track state. For example, the region may be identified again using at least one of the current position, velocity, or acceleration for the object.

Figure 21:
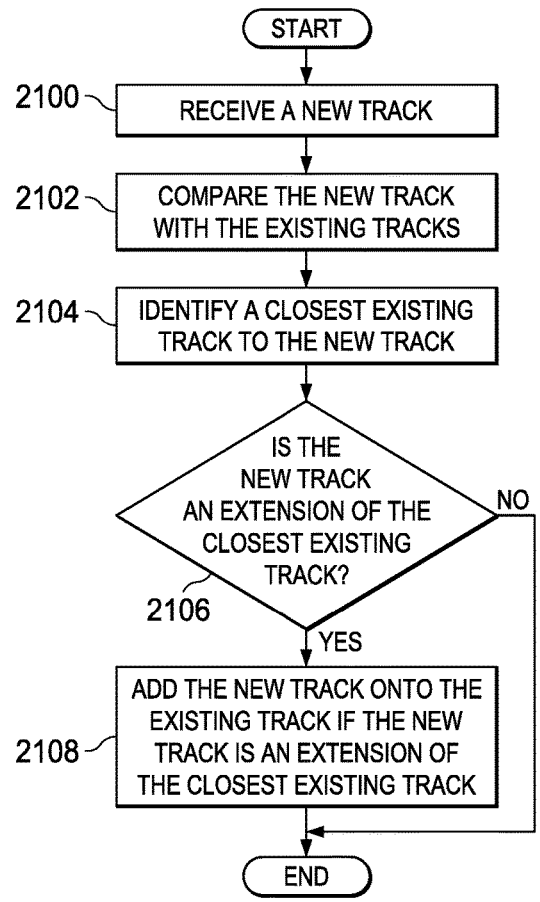
FIG. 21 is a flowchart of a process for extending a track in accordance with an illustrative embodiment.

With reference now to FIG. 21, a flowchart of a process for extending a track is depicted in accordance with an illustrative embodiment. The process illustrated in FIG. 21 is implemented in track extender 204 shown in block form in FIG. 2. The process in this flowchart is used to add an established track to an existing track in which the established track has been identified as a new track with respect to existing tracks.

The process begins by receiving a new track (step 2100). In this example, the new track is received from track combiner 202 shown in block form in FIG. 2.

The process then compares the new track with existing tracks (step 2102) and identifies a closest existing track to the new track (step 2104). A determination is made as to whether the new track is an extension of the closest existing track (step 2106). The process adds the new track onto the existing track if the new track is an extension of the closest existing track (step 2108) with the process terminating thereafter. In this manner, the new track extends the existing track. With reference again to step 2106, if the new track is not an extension of the closest existing track, the process terminates.

Figure 22:
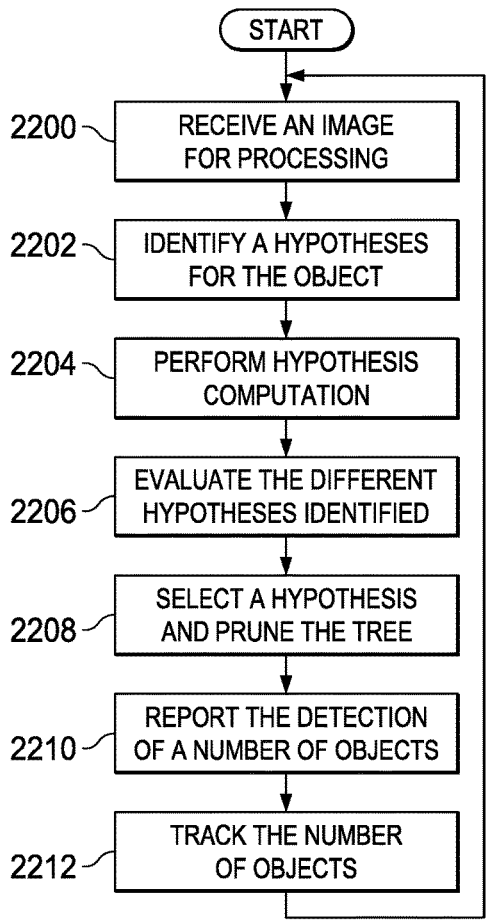
FIG. 22 is a flowchart of a process for detecting an object in accordance with an illustrative embodiment.

With reference now to FIG. 22, a flowchart of a process for detecting an object is depicted in accordance with an illustrative embodiment. The process illustrated in FIG. 22 may be implemented in track detector 200 shown in block form in FIG. 2.

In this process, a track for an object has already been generated such that the state of the object is known. In this example, the process may be used for track extension to handle cases when the object becomes dim and change in dynamic movement occurs. The change in dynamic movement may be, for example, a change in speed or a change in direction. However, in reality, this state of the object may not always be available when the object is too dim to be detected by a typical detector using single frame detection. In this case, the process detects any new tracks given an image or sub-region for the image.

The process begins by receiving an image for processing (step 2200). The image may be an image from a sensor system or may be a sub-image or a portion of another image.

The process then identifies hypotheses for an object (step 2202). In step 2202, the hypotheses are for potential movements or translations of the object in the image. The movement of the object with respect to x and y coordinates across the image is referred to as a translation of the object.

The process performs hypothesis computation (step 2204). The process then evaluates the different hypotheses identified (step 2206). The process selects a hypothesis and prunes the tree (step 2208). The hypothesis is the position where the object is detected.

The process reports the detection of a number of objects (step 2210). The detection includes the state of the object. The state includes the position and may also include at least one of a velocity or an acceleration of the object.

The process tracks the number of objects (step 2212). In step 2212, in tracking the number of objects, the process identifies when new tracks are present, creates tracks, and ends tracks using the detections. In step 2212, a number of established tracks are output based on the detection of the number of objects. The process then returns to step 2200 to receive another image for processing.

Figure 23:
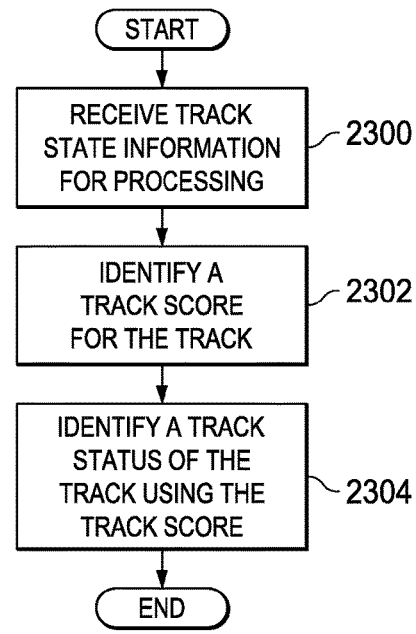
FIG. 23 is a flowchart of a process for identifying the status of tracks in accordance with an illustrative embodiment.

With reference next to FIG. 23, a flowchart of a process for identifying the status of tracks is depicted in accordance with an illustrative embodiment. The process illustrated in FIG. 23 may be implemented as part of step 2106 in FIG. 21 by track extender 204 in FIG. 2 and step 2212 in FIG. 22 by track detector 200 in FIG. 2.

The process begins by receiving track state information for processing (step 2300). In step 2300, the track state information includes the estimated state for a track and the covariance matrix for the track. This track state includes position, velocity, and acceleration. The covariance matrix for the state is the uncertainty of the estimated state. The covariance matrix is used in the Log likelihood score calculation described below in FIG. 23.

The process identifies a track score for the track (step 2302). In this illustrative example, the track score is generated using a Log likelihood score calculation. The Log likelihood ratio updates may be calculated as follows:

$L(0)=0$ $L(k)=L(k-1)+\Delta L(k)$ $\Delta L(k)=\ln(1-P_d)$, no observation update $\Delta L(k)=\Delta L_U(k)$, with observation update, where L is the log likelihood score; $P_d$ is the expected probability of detection of the system; k is time; and $\Delta L_u$ is the likelihood ratio.

The likelihood ratio has two elements, $\Delta L_K$ and $\Delta L_S$, as is as follows:

$\Delta L_U = \Delta L_K + \Delta L_S$, where $\Delta L_K$ is the score increment based on kinetic behavior of a track; and $\Delta L_S$ is the score increment based on the signal features for an observation. In this illustrative example, the observation is the location detected for an object. This location is the center of a cluster of pixels for the object The likelihood ratio is calculated as follows:

$$LR = \frac{P(D|H_1)P_0(H_1)}{P(D|H_0)P_0(H_0)} = \frac{P_T}{P_F},$$

where $P(D|H_1), P(D|H_0)$ are probability density functions evaluated with the received observations under the assumption that the detection hypothesis is correct; $P(D|H_1)$ represents a hypothesis that is correct for a given detection in which D is a true object; $P(D|H_0)$, represents a hypothesis that is incorrect for a given detection in which D is a true object. When a hypothesis is incorrect, the detection is for a false object. $P_0(H_1)$ and $P_0(H_0)$ are probabilities of the hypothesis.

The kinematic component of likelihood updates may be identified. In the certification, Gaussian distribution for a true object is assumed to be as follows:

$$\Delta L_K = \frac{P(D_K|H_1)}{P(D_K|H_0)} = \ln\left[\frac{P_d}{\beta_{FT}(2\pi)\sqrt{\det(S)}}\right] - \frac{d^2}{2},$$

where $\Delta L_K$ is the log likelihood score based on the kinematic of a track; K is time; $P_d$ is the expected probability of detection of the system; $P(D_K|H_1)$ is a probability that a given detection at time K that the detection is a true object; $P(D_K|H_0)$ is a probability that a given detection at time K that the detection is not a true object, but is a false object; and $\beta_{FT}$=false target density (probability of false alarms per unit area).

$S=HPH^T+R$, where H is the measurement output matrix; P is the state covariance matrix of the Kalman filter; R is the measurement covariance matrix of the Kalman filter; and S is the residual covariance matrix.

$d^2 = \tilde{y}^T S^{-1} \tilde{y}$, where $d^2$ is the normalized statistical distance; y is measurement position; T is the matrix transpose operation; and S is the is the residual covariance matrix.

The signal feature component of the likelihood updates is identified as follows:

$$\Delta L_S(y) = \ln\left(\frac{P(y|H_1)}{P(y|H_0)}\right),$$

where $P(y|H_1)$ is a probability that a given expected measurement is a true object; and $P(y|H_0)$ is a probability that a given expected measurement is not a true object, but it is a false object. The process also assumes probability of an object being present follows a Gaussian distribution with mean SNR ($\mu_s$) and unit variance. Then, the likelihood updates are represented as follows:

$$\Delta L_S(y) = \ln\left(\frac{P(y|H_1)}{P(y|H_0)}\right) = \ln\left(\frac{\exp\left[-\frac{(y-\mu_s)^2}{2}\right]/(\sqrt{2\pi})}{\exp\left[\frac{-y^2}{2}\right]/(\sqrt{2\pi})}\right) = \mu_s\left(y - \frac{\mu_s}{2}\right).$$

The process identifies a track status of the track using the track score (step 2304) with the process terminating thereafter. In this step, track status is identified using the track score LR as calculated in step 2302.

In this illustrative example, the track status may be, for example, selected from one of a candidate track, an established track, or a terminated track. As depicted, the track status is identified using a sequential probability ratio test. The test has two thresholds, a terminated track threshold and an established track threshold. The established track threshold is greater than the terminated track threshold.

If the score from step 2300 is greater than or equal to the established track threshold, the status of the track is an established track. If the score is less than or equal to the terminated track threshold, the track is a terminated track. The terminated track may be deleted. Deleting the track means that the tree that is associated with the track in the track extender is deleted.

Scores between the two thresholds result in a status of the track being a candidate track. In this illustrative example, a candidate track is track that has not been identified as one that is to be deleted or indicated as an established track.

As depicted, a candidate track is stored rather than deleted. The candidate track provides advantages in both the track extender and the track detector. For example, with the track extender, re-constructing a new tree increases the use of processing resources as compared to extending the tree for one level. In both the track detector and the track extender, a track may require a longer time to reach for establishment status in which the score exceeds the established track threshold. This situation may occur from a missed detection in which the object is not detectable in certain time or a large error in the track state's covariance is caused by a false detection, such as a detection that is not a target. The situation may also occur from receiving an external cue track that is not up-to-date.

False detections are usually random. As a result, keeping a candidate track will allow more time for a track to reach back to the established region if a persistent target is found. If the candidate track falls below the candidate region during scoring, the track is then removed. As a result, this additional time provides more time to make a decision as to whether to send the track to the track extender for continued tracking or to terminate the track internally.

Thus, in the track extender, the use of candidate tracks provides an ability to provide more time for a low quality track, such as a track that does not meet the established track threshold to be an established track. For example, the track extender may receive an external cued track with a large track state covariance. Rather than ignore this track completely, the track is treated as a candidate and more time is present to decide whether the candidate track is an established track or a terminated track.

In this illustrative example, the established track threshold T2 is identified as follows:

$$T2 = \ln\left(\frac{1-\beta}{\alpha}\right),$$

where β is a true deletion probability; α is a false track confirmation probability; and $$\alpha = \frac{\text{Number of false tracks confirmed}}{\text{Number of false alarms over a period}}.$$

The track deletion threshold T1 is identified as follows:

$$T1 = \ln(\beta/(1-\alpha)),$$

where β is a true deletion probability; α is a false track confirmation probability; and $$\alpha = \frac{\text{Number of false tracks confirmed}}{\text{Number of false alarms over a period}}.$$

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 24:
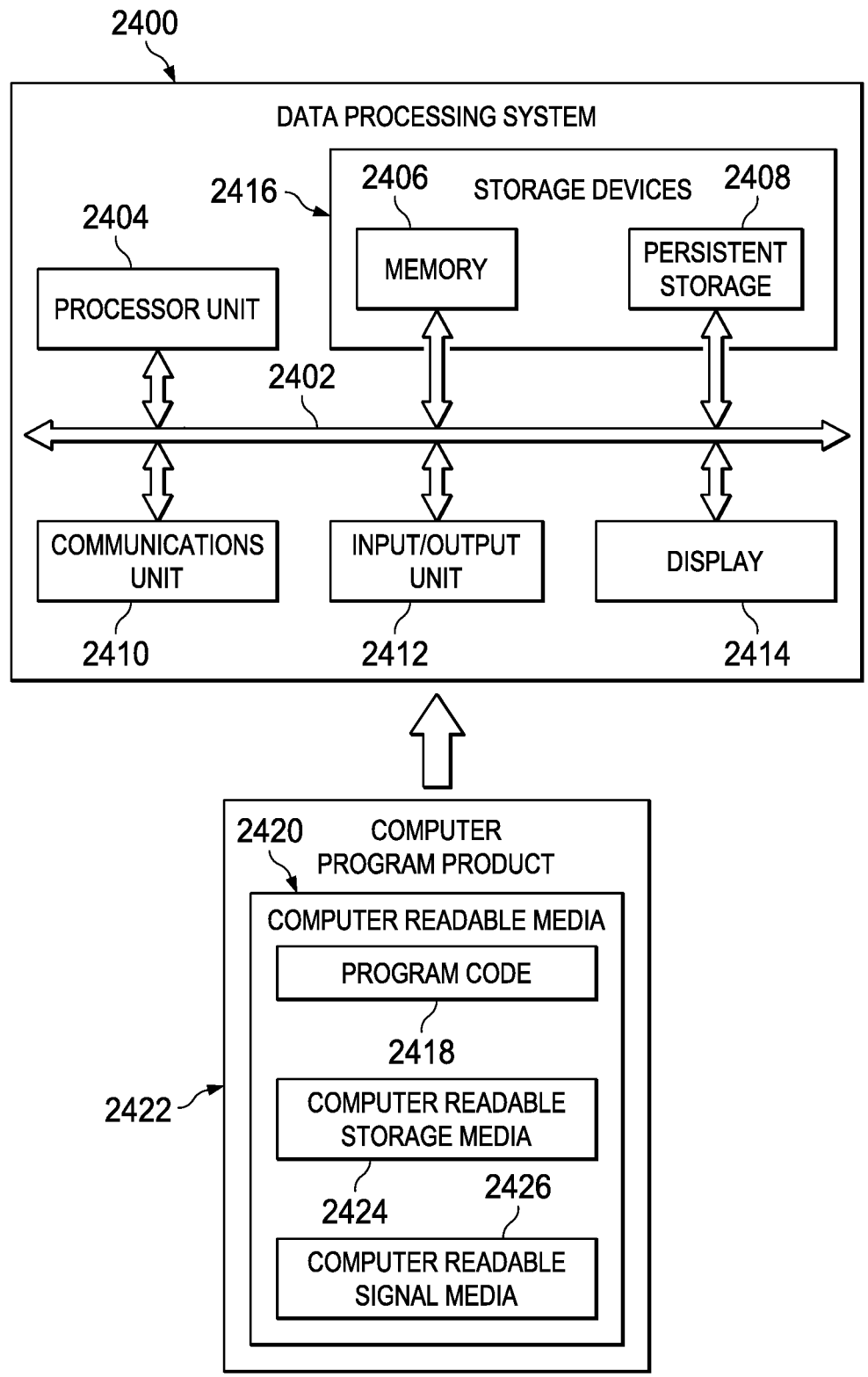
FIG. 24 is an illustration of a block diagram of a data processing system in accordance with an illustrative embodiment.

Turning now to FIG. 24, an illustration of a block diagram of a data processing system is depicted in accordance with an illustrative embodiment. Data processing system 2400 may be used to implement computer system 114 shown in block form in FIG. 1. In this illustrative example, data processing system 2400 includes communications framework 2402, which provides communications between processor unit 2404, memory 2406, persistent storage 2408, communications unit 2410, input/output (I/O) unit 2412, and display 2414. In this example, communications framework 2402 may take the form of a bus system.

Processor unit 2404 serves to execute instructions for software that may be loaded into memory 2406. Processor unit 2404 may be a number of processors, a multi-processor core, or some other type of processor, depending on the particular implementation.

Memory 2406 and persistent storage 2408 are examples of storage devices 2416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2416 may also be referred to as computer readable storage devices in these illustrative examples. Memory 2406, in these examples, may be, for example, a random access memory or any other suitable volatile or non-volatile storage device. Persistent storage 2408 may take various forms, depending on the particular implementation.

For example, persistent storage 2408 may contain one or more components or devices. For example, persistent storage 2408 may be a hard drive, a solid state hard drive, a flash memory, a rewritable optical disk, a rewritable magnetic tape, or some combination of the above. The media used by persistent storage 2408 also may be removable. For example, a removable hard drive may be used for persistent storage 2408.

Communications unit 2410, in these illustrative examples, provides for communications with other data processing systems or devices. In these illustrative examples, communications unit 2410 is a network interface card.

Input/output unit 2412 allows for input and output of data with other devices that may be connected to data processing system 2400. For example, input/output unit 2412 may provide a connection for user input through at least one of a keyboard, a mouse, or some other suitable input device. Further, input/output unit 2412 may send output to a printer. Display 2414 provides a mechanism to display information to a user.

Instructions for at least one of the operating system, applications, or programs may be located in storage devices 2416, which are in communication with processor unit 2404 through communications framework 2402. The processes of the different embodiments may be performed by processor unit 2404 using computer-implemented instructions, which may be located in a memory, such as memory 2406.

These instructions are referred to as program code, computer usable program code, or computer readable program code that may be read and executed by a processor in processor unit 2404. The program code in the different embodiments may be embodied on different physical or computer readable storage media, such as memory 2406 or persistent storage 2408.

Program code 2418 is located in a functional form on computer readable media 2420 that is selectively removable and may be loaded onto or transferred to data processing system 2400 for execution by processor unit 2404. Program code 2418 and computer readable media 2420 form computer program product 2422 in these illustrative examples. In one example, computer readable media 2420 may be computer readable storage media 2424 or computer readable signal media 2426. In these illustrative examples, computer readable storage media 2424 is a physical or tangible storage device used to store program code 2418 rather than a medium that propagates or transmits program code 2418.

Alternatively, program code 2418 may be transferred to data processing system 2400 using computer readable signal media 2426. Computer readable signal media 2426 may be, for example, a propagated data signal containing program code 2418. For example, computer readable signal media 2426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2400 are not meant to provide architectural limitations to the manner in which different embodiments may be implemented. The different illustrative embodiments may be implemented in a data processing system including components in addition to or in place of those illustrated for data processing system 2400. Other components shown in FIG. 24 can be varied from the illustrative examples shown. The different embodiments may be implemented using any hardware device or system capable of running program code 2418.

Thus, the illustrative examples provide a method and apparatus for performing at least one of detecting or tracking an object. The illustrative examples provide one or more technical solutions that enable the desired level of detection of objects that are not detectable in a single image.

The illustrative examples do not assume a constant object trajectory and velocity over a sequence of images. Instead, the illustrative examples keep track of image by image movements. For example, when an image in a sequence of images, such as frames, is received from a sensor, a new hypothesis space containing all possible movements of the object is formed and each hypothesis in the hypothesis space is evaluated by a scoring function. This hypothesis space is tracked in a tree with each hypothesis represented by a path through the tree.

Hypotheses are kept and evaluated over a sequence of frames over time to provide a more accurate object signal integration. The score functions are designed such that that the integration of an object signal maximizes object characteristics, such as a signal-to-noise ratio.

Further the illustrative examples do not integrate the object signal over the sequence of frames all at once. Instead, the illustrative examples integrate the object signal frame-by-frame by evaluating each hypothesis of object movements in a hypothesis space. Thus, if the dynamic behavior of an object changes from one frame to the next, this change in dynamic behavior is captured in the hypothesis space. The dynamic behavior change may include at least one of velocity or acceleration.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, implemented using a computer, for analyzing a sequence of images, the method comprising:
   identifying, using a processor, signal-to-noise ratios for potential tracks using a tree having hierarchies of nodes, identifying potential positions for an object over a period of time and using the sequence of images, wherein each hierarchy in the hierarchies of nodes represents a time and the potential positions in the tree form the potential tracks for the object;
   selecting, using the processor, a potential track from the potential tracks as an established track for the object using the signal-to-noise ratios;
   reporting, using the processor, a detection of the object; and
   sending, using the processor, the detection to a device comprising one of hardware or software or a combination thereof.

2. The method of claim 1 further comprising:
   creating, using the processor, the tree having the hierarchies of nodes identifying the potential positions for the object over the period of time using the sequence of images, wherein each hierarchy in the hierarchies of nodes represents the time and the potential positions in the tree form the potential tracks for the object.

3. The method of claim 1 further comprising:
   updating, using the processor, the tree to include a new hierarchy of nodes for the time when a new image is received in the sequence of images; and
   repeating, using the processor, the identifying, selecting, and reporting steps using the tree as updated with the new image.

4. The method of claim 1, wherein identifying the signal-to-noise ratios for the potential tracks comprises:
   summing, using the processor, images corresponding to nodes for the potential track in the potential tracks to form a summed image; and
   calculating, using the processor, a signal-to-noise ratio for the summed image.

5. The method of claim 1, wherein in selecting the potential track from the potential tracks as the established track for the object using the signal-to-noise ratios comprises:
   selecting, using the processor, the potential track having a highest signal-to-noise ratio in the signal-to-noise ratios.

6. The method of claim 1, wherein selecting the potential track from the potential tracks as the established track for the object using the signal-to-noise ratios comprises:
   selecting, using the processor, the potential track using at least one of the signal-to-noise ratios, a track state, or an object shape.

7. The method of claim 1 further comprising:
   reducing, using the processor, an amount of storage space needed to maintain the tree by pruning a root node that was not selected from the tree and pruning at least sibling nodes that were not selected from the tree.

8. The method of claim 1 further comprising:
   receiving, using the processor, an external track cue for the potential track;

identifying, using the processor, a region that encompasses the potential positions for the object over the period of time;
creating, using the processor, the tree having the hierarchies of nodes identifying the potential positions for the object over the period of time using a most current position in the external track cue; and
identifying, using the processor, the signal-to-noise ratios for the potential tracks identified from the external track cue.

9. The method of claim 8 further comprising:
identifying, using the processor, track state information for a node in the hierarchies of nodes representing a latest position in the potential track identified for the object; and updating the region using the track state information.

10. The method of claim 1 further comprising:
performing, using the processor, an action with respect to at least one of the object or a platform.

11. A computer comprising:
a processor;
a computer readable storage medium in communication with the processor, the computer readable storage medium storing program code which, when executed by the processor, performs a computer implemented method, the program code comprising;
an image analyzer, executable by the processor, that identifies signal-to-noise ratios for potential tracks using a tree having hierarchies of nodes identifying potential positions for an object over a period of time and using a sequence of images, wherein each hierarchy in the hierarchies of nodes represents a time and the potential positions in the tree form the potential tracks for the object; selects a potential track from the potential tracks as an established track for the object using the signal-to-noise ratios; and reports a detection of the object, wherein the detection of the object is sent to a device comprising one of hardware or software or a combination thereof.

12. The computer of claim 11, wherein the image analyzer, by the processor, creates the tree having the hierarchies of nodes identifying the potential positions for the object over the period of time using the sequence of images, wherein each hierarchy in the hierarchies of nodes represents the time and the potential positions in the tree form the potential tracks for the object.

13. The computer of claim 11, wherein the image analyzer, by the processor, updates the tree to include a new hierarchy of nodes for the time when a new image is received in the sequence of images;
repeats identifying the signal-to-noise ratios for the potential tracks using the tree having the hierarchies of nodes identifying the potential positions for the object over the period of time using the sequence of images, wherein each hierarchy in the hierarchies of nodes represents the time and the potential positions in the tree form the potential tracks for the object;
selects the potential track from the potential tracks as the established track for the object using the signal-to-noise ratios; and
reports the detection of the object using the tree as updated with the new image.

14. The computer of claim 11, wherein in identifying the signal-to-noise ratios for the potential tracks, the image analyzer, by the processor, sums images corresponding to nodes for the potential track to form a summed image and calculates a signal-to-noise ratio for the summed image.

15. The computer of claim 11, wherein in selecting the potential track from the potential tracks as a track for the object using the signal-to-noise ratios, the image analyzer, by the processor, selects the potential track having a highest signal-to-noise ratio in the signal-to-noise ratios.

16. The computer of claim 11, wherein in selecting the potential track from the potential tracks as a track for the object using the signal-to-noise ratios, the image analyzer, by the processor, selects the potential track using at least one of the signal-to-noise ratios, a track state, or an object shape.

17. The computer of claim 11, wherein the image analyzer, by the processor, reports at least one of a latest position, the established track, a direction, a velocity, or an acceleration.

18. The computer of claim 11, wherein the image analyzer, by the processor, receives an external track cue for the track;
identifies a region that encompasses the potential positions for the object over the period of time;
creates the tree having the hierarchies of nodes identifying the potential positions for the object over the period of time using a most current position in the external track cue; and identifies the signal-to-noise ratios for the potential tracks identified from the external track cue.

19. The computer of claim 18, wherein the image analyzer, by the processor, identifies state information for a node in the hierarchies of nodes representing a latest position in the potential track identified for the object; and updates the region using the state information.

20. A computer system comprising:
a processor;
a computer readable storage medium in communication with the processor, the computer readable storage medium storing program code which, when executed by the processor, performs a computer implemented method, the program code comprising;
a track detector, executable by the processor, wherein the track detector creates a tree having hierarchies of nodes, identifying potential positions for an object that moves over time using a sequence of images, wherein each hierarchy in the hierarchies of nodes represents a time and the potential positions in the tree form at least potential tracks for the object that identifies a track in the sequence of images; identifies signal-to-noise ratios for the potential tracks; and selects a potential track from the potential tracks as an established track for the object using the signal-to-noise ratios,
a track combiner in communication with the track detector, wherein the track combiner, by the processor, receives the established track from the track detector and determines whether the established track is a new track using a group of existing tracks; and
a track extender in communication with the track combiner, wherein the track extender, by the processor, receives the new track from the track combiner and adds the new track to the group of existing tracks.

21. The computer system of claim 20, wherein the track extender, by the processor, receives an external track cue for the new track;
identifies a region that encompasses the potential positions for the object over a period of time;
creates the tree having the hierarchies of nodes identifying the potential positions for the object over the period of time using a most current position in the external track cue; and
identifies a signal-to-noise ratio for the potential tracks identified from the external track cue.

22. The computer system of claim 20, wherein the track extender, by the processor, identifies a region in which the object for the new track is expected to travel and the region in the sequence of images is used.

23. The computer system of claim 20, wherein in adding the established track to the group of existing tracks, the track extender, by the processor, determines whether an existing track in the group of existing tracks has a last position close enough to a first position in the established track;
   adds the established track to the existing track when the last position is close enough to the first position; and
   creates a new existing track when the last position is not close enough to the first position.

* * * * *